United States Patent
Bachels et al.

(10) Patent No.: US 11,506,590 B2
(45) Date of Patent: Nov. 22, 2022

(54) SCATTERED LIGHT SMOKE DETECTOR HAVING A TWO-COLOR LED, A PHOTOSENSOR, AND A WAVELENGTH-SELECTIVE POLARIZER CONNECTED UPSTREAM OF THE PHOTOSENSOR OR CONNECTED DOWNSTREAM OF THE TWO-COLOR LED, AND SUITABLE USE OF SUCH A POLARIZER

(71) Applicant: Siemens Schweiz AG, Zürich (CH)

(72) Inventors: Thomas Bachels, Benzenschwil (CH); Mathias Staeger, Menzingen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 17/280,604

(22) PCT Filed: Sep. 26, 2019

(86) PCT No.: PCT/EP2019/076041
§ 371 (c)(1),
(2) Date: Mar. 26, 2021

(87) PCT Pub. No.: WO2020/064935
PCT Pub. Date: Apr. 2, 2020

(65) Prior Publication Data
US 2021/0372913 A1     Dec. 2, 2021

(30) Foreign Application Priority Data

Sep. 28, 2018  (EP) .................................. 18197690

(51) Int. Cl.
*G01N 15/06*  (2006.01)
*G01N 15/10*  (2006.01)
*G08B 17/107* (2006.01)

(52) U.S. Cl.
CPC ............. *G01N 15/06* (2013.01); *G01N 15/10* (2013.01); *G08B 17/107* (2013.01); *G01N 2015/0693* (2013.01); *G01N 2015/1087* (2013.01)

(58) Field of Classification Search
CPC .................. G01N 15/06; G01N 15/10; G01N 2015/0693; G01N 2015/1087; G08B 17/107
(Continued)

(56) References Cited

U.S. PATENT DOCUMENTS 5,280,272 A * 1/1994 Nagashima .......... G08B 17/107
340/630
5,576,697 A 11/1996 Nagashima et al. .......... 340/630
(Continued)

FOREIGN PATENT DOCUMENTS

CN    1882968 A * 12/2006 ............. G01N 21/21
DE    4415063 A1  11/1994 ........... G08B 17/107
(Continued)

OTHER PUBLICATIONS

Search Report for International Application No. PCT/EP2019/076041, 6 pages, dated Jan. 17, 2020.
(Continued)

*Primary Examiner* — Michael A Lyons
*Assistant Examiner* — Omar H Nixon
(74) *Attorney, Agent, or Firm* — Slayden Grubert Beard PLLC

(57) ABSTRACT

Various embodiments include a scattered light smoke detector comprising: a two-color LED for emitting light of a first wavelength and a second wavelength; a photosensor spectrally matched with said two-color LED; and a control unit connected to the two-color LED and to the photosensor. The control unit is configured to control the two-color LED to
(Continued)

emit light of the first wavelength or the second wavelength and to detect a photosensor signal of the photosensor. The control unit is further configured to analyze the photosensor signal for a first scattered radiation intensity and a second scattered radiation intensity allocated respectively to the first wavelength and the second wavelength. There is a polarizer optically connected upstream of the photosensor or downstream of the two-color LED. The polarizer polarizes light passing through at different intensities in dependence upon the respective wavelength of said light.

18 Claims, 5 Drawing Sheets

(58) Field of Classification Search
USPC .......................................................... 356/338
See application file for complete search history.

(56) References Cited

U.S. PATENT DOCUMENTS

| | | | |
|---|---|---|---|
| 9,569,946 B2 | 2/2017 | Aebersold | |
| 10,885,757 B2 | 1/2021 | Duric et al. | |
| 2011/0175741 A1* | 7/2011 | Slemon | G08B 17/107 340/630 |
| 2011/0188039 A1* | 8/2011 | Aoyama | G01N 15/06 356/338 |
| 2012/0140231 A1* | 6/2012 | Knox | H01L 29/7786 356/442 |
| 2014/0265053 A1* | 9/2014 | Morizur | C08L 69/00 525/70 |
| 2014/0333928 A1* | 11/2014 | Erdtmann | G08B 17/107 356/338 |
| 2015/0103346 A1* | 4/2015 | Erdtmann | G08B 17/107 356/338 |
| 2015/0228171 A1* | 8/2015 | Aebersold | G08B 17/107 340/630 |
| 2016/0202165 A1 | 7/2016 | Wei | G01N 15/0227 |
| 2016/0307423 A1* | 10/2016 | Ebner | G08B 17/12 |

FOREIGN PATENT DOCUMENTS

| | | | | |
|---|---|---|---|---|
| DE | 10 2013 219181 | | 3/2015 | ............. G01N 15/14 |
| DE | 10 2015 117361 | | 4/2016 | ............. G01N 21/53 |
| EP | 0588232 A1 | * | 3/1994 | ........... G08B 17/113 |
| EP | 0926646 A1 | | 6/1999 | ............. G08B 17/107 |
| EP | 1 887 536 | | 2/2008 | ............. G08B 17/107 |
| EP | 2 676 596 | | 12/2013 | ................ A61B 1/00 |
| EP | 2908298 A1 | | 8/2015 | ........... G08B 17/107 |
| EP | 3287999 A1 | * | 2/2018 | ................ G01J 1/08 |
| WO | 2005 043479 | | 5/2005 | ............. G08B 17/00 |
| WO | 2018/138004 A1 | | 8/2018 | ............. H01L 33/50 |

OTHER PUBLICATIONS

M.Loepfe; P.Ryser; C.Tompkin; D.Wieser; "Optical Properties of Fire and Non-fire Aerosols" 10 pages, 1997.

* cited by examiner

SCATTERED LIGHT SMOKE DETECTOR HAVING A TWO-COLOR LED, A PHOTOSENSOR, AND A WAVELENGTH-SELECTIVE POLARIZER CONNECTED UPSTREAM OF THE PHOTOSENSOR OR CONNECTED DOWNSTREAM OF THE TWO-COLOR LED, AND SUITABLE USE OF SUCH A POLARIZER

CROSS-REFERENCE TO RELATED APPLICATIONS

This application is a U.S. National Stage Application of International Application No. PCT/EP2019/076041 filed Sep. 26, 2019, which designates the United States of America, and claims priority to EP Application No. 18197690.3 filed Sep. 28, 2018, the contents of which are hereby incorporated by reference in their entirety.

TECHNICAL FIELD

The present disclosure relates to smoke detectors. Various embodiments may include a scattered light smoke detector.

BACKGROUND

A two-color LED is typically embodied so as to emit light of the first wavelength $\lambda_1$ in a range of 380 nm to 570 nm, in particular of 470 nm±30 nm. Furthermore, the two-color LED is embodied so as to emit light of the second wavelength $\lambda_2$ in a range of 750 nm to 1100 nm, in particular of 940 nm±30 nm. A two-color LED of this type is in particular actuated in a pulsed manner. The two-color LED can be actuated by means of an electronic control unit so as to emit pulsed light of the first wavelength $\lambda_1$, of the second wavelength $\lambda_2$ or so as to simultaneously emit light of the first and second wavelength $\lambda_1$, $\lambda_2$.

WO 2018/138004 A1 describes an arrangement for optical smoke detection according to the two-color principle. The two-color light-emitting diode comprises an LED chip for emitting light in a first wavelength range and a light converter for converting a part of the emitted light into light of a second wavelength range. The second wavelength range has a spectral peak width at half-height of maximum 100 nm.

In the field of optical smoke detection, optical smoke detectors that operate according to the two-color principle are referred to synonymously as blue/red detectors according to the more or less "blue" first wavelength range and according to the more or less "red" second wavelength range. In this case, the color "blue" here also includes the adjoining shorter wavelength in the near-ultraviolet (NUV) and the color "red" includes the adjoining longer wavelength in the near-infrared (NIR).

The use of a two-color LED, in other words a two-color light-emitting diode for optical smoke detection according to the so-called two-color principle is known for example from EP 3 029 646 A1 and EP 2 908 298 A1. The described two-color LEDs comprise a chip carrier on which two LED chips are arranged adjacent to one another, wherein the one LED chip emits light of the first "blue" wavelength $\lambda_1$ and the other LED chip emits light of the second "red" wavelength $\lambda_2$. The scattered light arrangements in the mentioned documents having a two-color LED as a component and a photosensor render it possible in dependence upon the scatter angle between the two-color LED and the photosensor to reliably identify the test fire TF2 (pyrolysis smoldering fire) that is specified in accordance with the standard EN54-7:2018 and also the test fire TF4 (open plastics fire) and TF5 liquid fire, n-heptane). The arrangement also renders it possible to detect water vapor as a possible disturbance variable.

FIG. 5 illustrates this for clarity with a distribution of test fires plotted against a quotient $Q_{O2}$. The latter is the ratio of the scattered radiation intensity $I_{\lambda 1}$ of the first "blue" wavelength with respect to the scattered radiation intensity $I_{\lambda 2}$ of the second "red" wavelength $\lambda_2$ of a respective photosensor signal. In this case, the scatter angle between the two-color LED and the photosensor has for example a typical angle value of 120°. However, it is not possible to reliably differentiate between open fires, which also includes the test fire TF4 and TF5, and the test fire TF3 (smoldering cotton fire).

Moreover, the use of polarized IR light for optical smoke detection is known. A corresponding scattered light arrangement has an IR light-emitting diode and two photosensors that are arranged at an identical scatter angle with respect to the IR light-emitting diode. A linear polarization filter is connected upstream of only one of the photosensors. An arrangement of this type renders it possible to reliably identify the test fire TF2 (pyrolysis smoldering fire) that is specified in accordance with the standard EN54-7:2018 and also the test fire TF3 (smoldering cotton fire), TF4 (open plastics fire) and TF5 (liquid fire involving n-heptane). However, it is not possible to reliably differentiate between the test fire TF2 and the disturbance variable water vapor or water mist. The following FIG. 5 illustrates this for clarity with a distribution of the test fires plotted against a quotient $Q_{O1s}$. The quotient $Q_{O1s}$ is the ratio of the scattered radiation intensity from perpendicular polarized IR light and of the scattered radiation intensity from unpolarized IR light in the case of a scatter angle of 90°. The polarization plane of the polarizer extends in this case perpendicular to the scatter plane.

EP 0 926 646 A1 describes a smoke detector in which visible blue and red light is used for the detection of scattered light. Two measurement channels are provided, of which one is constructed in a conventional manner and one infrared transmitter diode and also one receiver diode, and the other includes a colored LED and/or a polarization filter. Two transmitter diodes and one receiver diode or one transmitter diode and two receiver diodes are provided, wherein in the latter case the second receiver diode is connected upstream of a polarization filter or the second receiver diode can be embodied as a backward scatterer, possibly having a polarization filter connected upstream. The polarization filter can also be arranged between the transmitter diode and a measurement chamber of the optical smoke detector.

DE 44 15 063 A1 describes a fire alarm system has a first light-emitting element, a first polarization filter, a first light receiving element, a second light-emitting element, a second polarization filter, and a second light-receiving element. By means of this arrangement, the value of the component that is polarized parallel to a scatter plane is determined as well as the value of the component that is polarized perpendicular to the scatter plane. The ratio between these values of the light is related to the type of the smoke. A calculating section calculates this ratio from the output signals of the light-receiving elements. A decision section compares the mentioned ratio to a previously determined reference value that corresponds to the type of the smoke that is to be identified, wherein the decision as to whether it is a fire or not depends upon the type of smoke. Consequently, it is possible to identify a fire on the basis of the light that is scattered by smoke taking into account the type of the smoke.

DE 10 2015 117 361 A1 describes an apparatus that measures the light that is scattered on aerosols at a specific angle configuration by means of at least one light detection facility. The apparatus calculates an amount of polarization from the detection signals of the at least one light detection facility by means of a measuring and computing facility and in specific embodiments calculates a degree of depolarization. It is possible with the aid of the value of the amount of polarization to clearly differentiate water droplets from aerosols that are caused by fires. It is possible with the aid of the value of the degree of depolarization to clearly differentiate dust particles from aerosols that are caused by fires. The angle at which the scattered light measurement is performed is 35° (corresponds to a backward scatter angle of 145°) or a scattered light measurement is performed at two angles (5°, 95°).

In the scientific publication of M. Loepfe et al: "Optical Properties of Fire and Non-fire Aerosols" published in the "Fire Safety Journal, 29 (1997) 185-194", the degree of polarization of test fires and disturbance variables such as water was tested in an angle range of 0° to 180°. In the described angle and polarization dependent light scattering experiment, based on their degree of polarization of the scattered light, the aerosols of the EN54 test fires can be divided into three groups: TF1, TF4 and TF5 form relatively small particles with weak scattering in the visible and in the near infrared range however with a high degree of polarization of P=0.9, measured at a wavelength of 690 nm and at an angle of 90°. TF3 generates an aerosol of medium-sized particles having a degree of polarization of P=0.3 at 90°. TF2 generates an aerosol that has large particles having a degree of polarization of P=−0.1 at 90°. Water vapor, a disrupting non-fire aerosol differs from the above-described fire aerosols by a characteristic angle dependency of the degree of polarization, in particular in an angle range by 150°.

SUMMARY

As an example, some embodiments of the teachings herein include a scattered light smoke detector comprising a two-color LED (1) for emitting light of a first and a second wavelength $\lambda_2$, $\lambda_2$, a photosensor (2) spectrally matched with said two-color LED, and also a control unit (3) wherein the control unit (3) being connected to the two-color LED (1) and to the photosensor (2) and being configured to control the two-color LED (1) for emitting light of the first or second wavelength $\lambda_1$, $\lambda_2$, being configured to detect a photosensor signal of the photosensor (2), being configured to determine on the basis of the photosensor signal a first and second scattered radiation intensity $I_{\lambda 1}$, $I_{\lambda 2}$ that is allocated to the first and the second wavelength $\lambda_1$, $\lambda_2$ and being configured to take into account the first and second scattered radiation intensities $I_{\lambda 1}$, $I_{\lambda 2}$ in the event of a fire alarm (AL), characterized in that the scattered light smoke detector comprises a polarizer (Pλ) that is optically connected upstream of the photosensor (2) or is optically connected downstream of the two-color LED (1), wherein the polarizer (Pλ) has optical properties such that the light that is passing through the polarizer (Pλ) is polarized at different intensities in dependence upon the respective wavelength $\lambda_1$, $\lambda_2$ of said light.

In some embodiments, the polarizer (Pλ) has optical properties such that the light of the first wavelength $\lambda_1$ that is passing through the polarizer (Pλ) is at least in part polarized while the light of the second wavelength $\lambda_2$ that is passing through is essentially not polarized.

In some embodiments, the polarizer (Pλ) has optical properties such that the light of the second wavelength $\lambda_2$ that is passing through the polarizer (Pλ) has a maximum degree of polarization of 0.05.

In some embodiments, the polarizer (Pλ) comprises a polarization plane and also has optical properties such that a proportion of at least 50%, in particular at least 80%, of the light of the first wavelength $\lambda_1$ that is polarized parallel to the polarization plane of the polarizer (Pλ) passes through the polarizer (Pλ), while a proportion of at most 5%, in particular at most 1%, of light of the first wavelength $\lambda_1$ that is polarized perpendicular to the polarization plane of the polarizer passes through the polarizer (Pλ).

In some embodiments, the polarizer (Pλ) is a wavelength-selective linear polarizer, and wherein the polarizer (Pλ) is a polarizer produced from a polymer film, in particular from a polyvinyl alcohol film having diffused iodine; a wire mesh polarizer or a dye type polarizer.

In some embodiments, the two-color LED (1) is arranged at a first scatter angle (al) of 45° to 135°, in particular of 60° to 120° and preferably of 90°±5°, with respect to the photosensor (2), wherein the two-color LED (1) and the photosensor (2) are oriented toward a common scattered light volume (SV), wherein the polarizer (Pλs) is a linear polarizer, wherein the polarizer (Pλs) is optically connected either upstream of the photosensor (2) or downstream of the two-color LED (1), and wherein the polarizer (Pλs) is oriented in such a manner that its polarization plane includes an angle of 90°±5° having a plane that is spanned by the optical axes (SA, EA) of the two-color LED (1) and the photosensor (2).

In some embodiments, the control unit (3) is configured for the purpose of: determining a first quotient Q1s of the two scattered radiation intensities $I_{\lambda 1}$, $I_{\lambda 2}$, outputting a fire alarm (AL) or a smoldering fire alarm (AL-SB) if the first quotient Q1s is within a first or second quotient range ($F_{TF2}$, $F_{TF3}$), or outputting a fire alarm (AL) or a fire alarm for an open fire (AL-OF) if the first quotient Q1s is within a third quotient range ($F_{OF}$).

In some embodiments, the control unit (3) is configured for the purpose of: determining a first quotient Q1s of the two scattered radiation intensities $I_{\lambda 1}$, $I_{\lambda 2}$, and suppressing an output of a fire alarm (AL) and/or for the purpose of outputting a warning message (W-H2O) for detected water vapor or water mist in the scattered light volume (SV) if the first quotient Q1s is within a fourth quotient range ($F_{H2O}$).

In some embodiments, for a respective value range of the quotient ranges ($F_{H2O}$, $F_{TF2}$, $F_{TF3}$, $F_{OF}$) the following applies:
quotient values of the fourth quotient range ($F_{H2O}$)<
quotient values of the first quotient range ($F_{TF2}$)<
quotient values of the second quotient range ($F_{TF3}$)<
quotient values of the third quotient range ($F_{OF}$).

In some embodiments, in lieu of the one photosensor (2), the scattered light smoke detector has a first and second photosensor (21, 22), wherein the two-color LED (1) is arranged at a first scatter angle (α1) of 45° to 135°, in particular of 60° to 120° and preferably of 90°±5°, with respect to the first photosensor (21), wherein the two-color LED (1) is arranged at a second scatter angle (α2) of 142°±5°, preferably of 142°±1°, with respect to the second photosensor (22), wherein the two-color LED (1) and the two photosensors (21, 22) are oriented toward a common scattered light volume (SV), wherein a polarizer (Pλp) is optically connected downstream of the two-color LED (1) and, in dependence upon the respective wavelength $\lambda_1, \lambda_2$ of the respective light that is emitted by the two-color LED (1) and that is passing through said polarizer, said polarizer polarizes said light at different intensities, wherein the control unit (3) is connected to the two-color LED (1) and to the two photosensors (21, 22) and is configured for the purpose of actuating the two-color LED (1) so as to emit light of the first or second wavelength $\lambda_1, \lambda_2$, for the purpose of detecting each photosensor signal of the two photosensors (21, 22), for the purpose of determining respectively a first and second scattered radiation intensity $I_{\lambda 11}, I_{\lambda 12}; I_{\lambda 21}, I_{\lambda 22}$ for the first and second wavelength $\lambda_1, \lambda_2$ on the basis of the respective photosensor signal and for the purpose of taking into account the respective first and second scattered radiation intensities $I_{\lambda 11}, I_{\lambda 12}; I_{\lambda 21}, I_{\lambda 22}$ in the event of a fire alarm (AL).

In some embodiments, in lieu of the one two-color LED (1), the scattered light smoke detector has a first and second two-color LED (11, 12), wherein the photosensor (2) is arranged at a first scatter angle ($\alpha$1) in the range of 45° to 135°, in particular of 60° to 120° and preferably of 90°±5°, with respect to the first two-color LED (11), wherein the photosensor (2) is arranged at a second scatter angle ($\alpha$2) of 142°±5°, preferably of 142°±1°, with respect to the second two-color LED (12), wherein the photosensor (2) and the two two-color LED (11, 12) are oriented toward a common scattered light volume (SV), wherein a polarizer (P$\lambda$p) is optically connected upstream of the photosensor (2) and, in dependence upon the respective wavelength $\lambda_2, \lambda_2$ of the respective light that is passing through, said polarizer polarizes said light at different intensities, wherein the control unit (3) is connected to the photosensor (2) and to the two two-color LEDs (11, 12) and is configured for the purpose of actuating the two two-color LEDs (11, 12) respectively so as to emit light of the first or second wavelength $\lambda_2, \lambda_2$, for the purpose of detecting a photosensor signal of the photosensor (2), for the purpose of determining respectively a first and second scattered radiation intensity $I_{\lambda 11}, I_{\lambda 12}; I_{\lambda 21}, I_{\lambda 22}$ for the first and second wavelength $\lambda_1, \lambda_2$ on the basis of the respective actuated two-color LED (11, 12) and for the purpose of taking into account the respective first and second scattered radiation intensities $I_{\lambda 11}, I_{\lambda 12}; I_{\lambda 21}, I_{\lambda 22}$ in the event of a fire alarm (AL).

In some embodiments, the polarizer (P$\lambda$p) is a linear polarizer and is oriented in such a manner that its polarization plane includes an angle of 0°±5° with a plane that is spanned by the optical axis (SA, EA) of the two-color LED (1) or the photosensor (2).

In some embodiments, the control unit (3) is configured for the purpose of: determining a second quotient Q2p of the first and second scattered radiation intensity $I_{\lambda 11}, I_{\lambda 12}$ that are allocated to the first scatter angle ($\alpha$1), determining a third quotient Q3p of the first and second scattered radiation intensity $I_{\lambda 21}, I_{\lambda 22}$ that are allocated to the second scatter angle ($\alpha$2), outputting a fire alarm (AL) and/or smoldering fire alarm (AL-SB) if the second quotient Q2p is within the further second quotient range, or outputting a fire alarm (AL) if the third quotient Q3p is within the yet further second quotient range, and suppressing an output of a fire alarm (AL) and/or for the purpose of outputting a warning message (W-H2O) for detected water vapor or water mist in the scattered light volume (SV) if the second quotient Q2p is within the further first quotient range and/or if the third quotient Q3p is within the yet further first quotient range.

In some embodiments, the control unit (3) is configured for the purpose of standardizing the first and second scattered radiation intensities $I_{\lambda 11}, I_{\lambda 12}$ that are allocated to the first scatter angle ($\alpha$1) to such an extent that the first quotient Q1s and/or the second quotient Q2p for scattered particles that are introduced into the scattered light volume (SV) and that have a predetermined average diameter in the range of 0.5 to 1.5 μm has a quotient value in the range of 1 to 3, in particular a quotient value of 2, and/or wherein the control unit (3) is configured for the purpose of standardizing the first and second scattered light intensities $I_{\lambda 21}, I_{\lambda 22}$ that are allocated to the second scatter angle ($\alpha$2) to such an extent that the third quotient Q3p for scattered particles that are introduced into the scattered light volume (SV) and that have a predetermined average diameter in the range of 0.5 to 1.5 μm has a quotient value in the range of 1 to 3, in particular a quotient value of 2.

BRIEF DESCRIPTION OF THE DRAWINGS

The teachings of the present disclosure and example embodiments thereof are explained in the example of the following figures. In the drawings.

DETAILED DESCRIPTION

Figure 1:
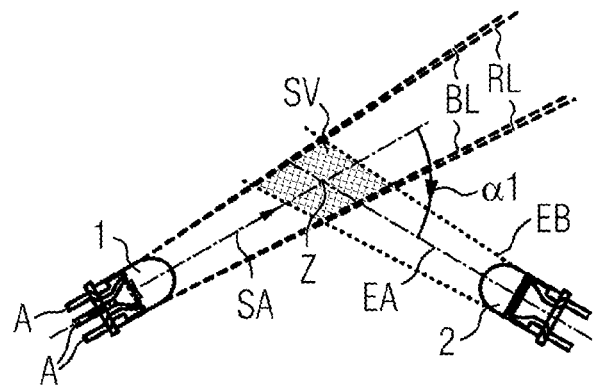
FIG. 1 shows a scattered light arrangement having a two-color LED and a photosensor according to the prior art.

Some scattered light smoke detectors have a two-color LED for emitting light of a first and a second wavelength $\lambda_1$, $\lambda_2$, a photosensor, which is spectrally matched with said two-color LED, and also a control unit. The two-color LED and the photosensor in this case form a so-called scattered light arrangement as part of the scattered light smoke detector. In some cases, the LED exclusively emits monochrome light of the first and second wavelength $\lambda_1$, $\lambda_2$. The control unit is connected to the two-color LED and to the photosensor for signal purposes and is configured for the purpose of actuating the two-color LED so as to emit light of the first and/or second wavelength $\lambda_1$, $\lambda_2$. The control unit is moreover configured for the purpose of detecting a photosensor signal that is emitted by the photosensor. Finally, the control unit is configured for the purpose of determining on the basis of the photosensor signal a first and second scattered radiation intensity $I_{\lambda_1}$, $I_{\lambda_2}$ that is allocated to the first and the second wavelength $\lambda_1$, $\lambda_2$ (chronologically) and for the purpose of simultaneously taking into account the first and second scattered radiation intensities $I_{\lambda_1}$, $I_{\lambda_2}$ in the event of a fire alarm.

An evaluation with regard to the particle characteristic or particle composition, such as for example the particle size, of the detected smoke particles is possible by suitably evaluating the first and second scattered radiation intensity $I_{\lambda_1}$, $I_{\lambda_2}$, which are received by the photosensor, such as for example by calculating a quotient of the two scattered radiation intensities $I_{\lambda_1}$, $I_{\lambda_2}$. It is then possible to a certain extent to differentiate for example between smoke, dust, and water vapor by suitably evaluating the identified particle sizes or a variable that is equivalent thereto. The teachings of the present disclosure describe a scattered light smoke detector having (only) one two-color LED and having (only) one photosensor.

It is assumed below that the light of the two wavelengths $\lambda_1$, $\lambda_2$ that is emitted by the two-color LED is unpolarized, in other words has a degree of polarization of 0 or approaching 0 (<0.05). The degree of polarization or the amount of polarization is defined as the quotient of the difference of the two radiation intensities to the sum of the two radiation intensities. In accordance with the definition, the difference of the two radiation intensities means the amount of this difference. The degree of polarization or the amount of polarization is moreover dependent upon the respective light wavelength.

For the following considerations, the following is defined:

The scatter plane (also scattered light plane) is the plane that is spanned by the optical axes of at least one light-emitting diode (LED) or two-color LED and at least one photosensor.

The polarizer plane is the plane of a flat, plate-shaped or film-shaped polarizer.

The polarization plane is the plane that is determined by the chronological direction of propagation and by the direction of oscillation of the light. If a polarizer comprises such a polarization plane, it is therefore intended that for light that falls in a perpendicular manner on the polarizer plane only the polarization proportions that lie parallel to the included polarization plane pass through the polarizer. The polarization plane that a polarizer comprises is consequently orthogonal with respect to the polarizer plane.

The polarization direction is always in the polarizer plane and is either parallel to the scatter plane or perpendicular to the scatter plane.

If a polarizer is optically connected downstream of a two-color LED, the polarizer plane of the polarizer is thus oriented at an angle of 90°+/−5° relative to the optical axis of the two-color LED, preferably normal (orthogonal) with respect to the optical axis of the two-color LED. If a polarizer is optically connected upstream of a photosensor, the polarizer plane of the polarizer is thus oriented at an angle of 90°+/−5 relative to the optical axis of the photosensor, preferably normal (orthogonal) with respect to the optical axis of the photosensor.

The two-color LED is a single-piece or single-part optoelectronic component, in other words therefore is a physical unit. It is preferred that such a two-color LED is a light-emitting diode having a transparent (standard) housing having a diameter of 3 mm or 5 mm. 3 mm or 5 mm light-emitting diodes of this type are known to be sold "off the shelf" as a mass-produced consumer product. The two-color LED can alternatively also be realized as an SMD component for surface assembly. In some embodiments, the two-color LED is embodied for the purpose of emitting only light of the first and/or second wavelengths $\lambda_2$, $\lambda_2$ as monochrome light of the first and/or second wavelengths $\lambda_2$, $\lambda_2$.

In some embodiments, the scattered light smoke detector has a polarizer that is optically connected upstream of the photosensor or is optically connected downstream of the two-color LED. The polarizer has optical properties such that the light that is passing through the polarizer is polarized or can be polarized at different intensities in dependence upon the respective wavelength $\lambda_1$, $\lambda_2$ of said light. A polarizer of this type is also referred to as a polarizing filter or as a polarization filter. In some embodiments, it is a linear polarizer. The light that is passing through the polarizer originates in this case either directly from the two-color LED or said light is scattered light from particles that are to be detected in the scattered light volume that is illuminated or irradiated by the two-color LED. The scattered light volume is geometrically or structurally defined as the intersecting volume from the emitted light beam of the two-color LED with the optical receiving sector of the respective photosensor.

In some embodiments, the combination of the two-color scattered light principle with the scattering of particles that is dependent upon the polarization of the light. This combination provides a reliable differentiation between open fires, smoldering fires, and water for suitable scatter angles. In this case, the two-color principle that renders it possible to reliably distinguish between open fire and water and the scattering that is dependent upon the polarization and that renders it possible to reliably distinguish between open fires and smoldering fires complement one another for suitable scatter angles.

In some embodiments, the differentiation criteria include both the wavelength dependency of the light scattering on the particles (aerosols) that are to be detected according to the two-color principle as well as the polarization effect by scattering on the aerosol. It is possible by a suitable selection of the polarization direction for the first wavelength $\lambda_1$ to intensify the ability to differentiate different aerosol categories by the two wavelengths $\lambda_1$, $\lambda_2$.

In some embodiments, there is a scattered light arrangement as part of the scattered light smoke detector, wherein the scattered light arrangement (only) comprises one two-color LED and one (1 channel) photosensor and the polarizer that acts in a wavelength-selective manner in relation to light of the two-color LED. In this case, the wavelength-selective polarization for suitable scatter angles causes a change or a displacement of the ratio of the two scattered radiation intensities $I_{\lambda,1}$, $I_{\lambda,2}$, in other words of the blue/red or of the red/blue ratio, and namely in the manner that it is possible to reliably distinguish open fires from smoldering fires (TF2) (cf. in this regard the ratio Q1s in FIG. 5 in the case of an exemplary scatter angle of 90°).

As a consequence, the alarm times of open fires and TF2 smoldering fires can be better adapted to the respective fire.

Figure 5:
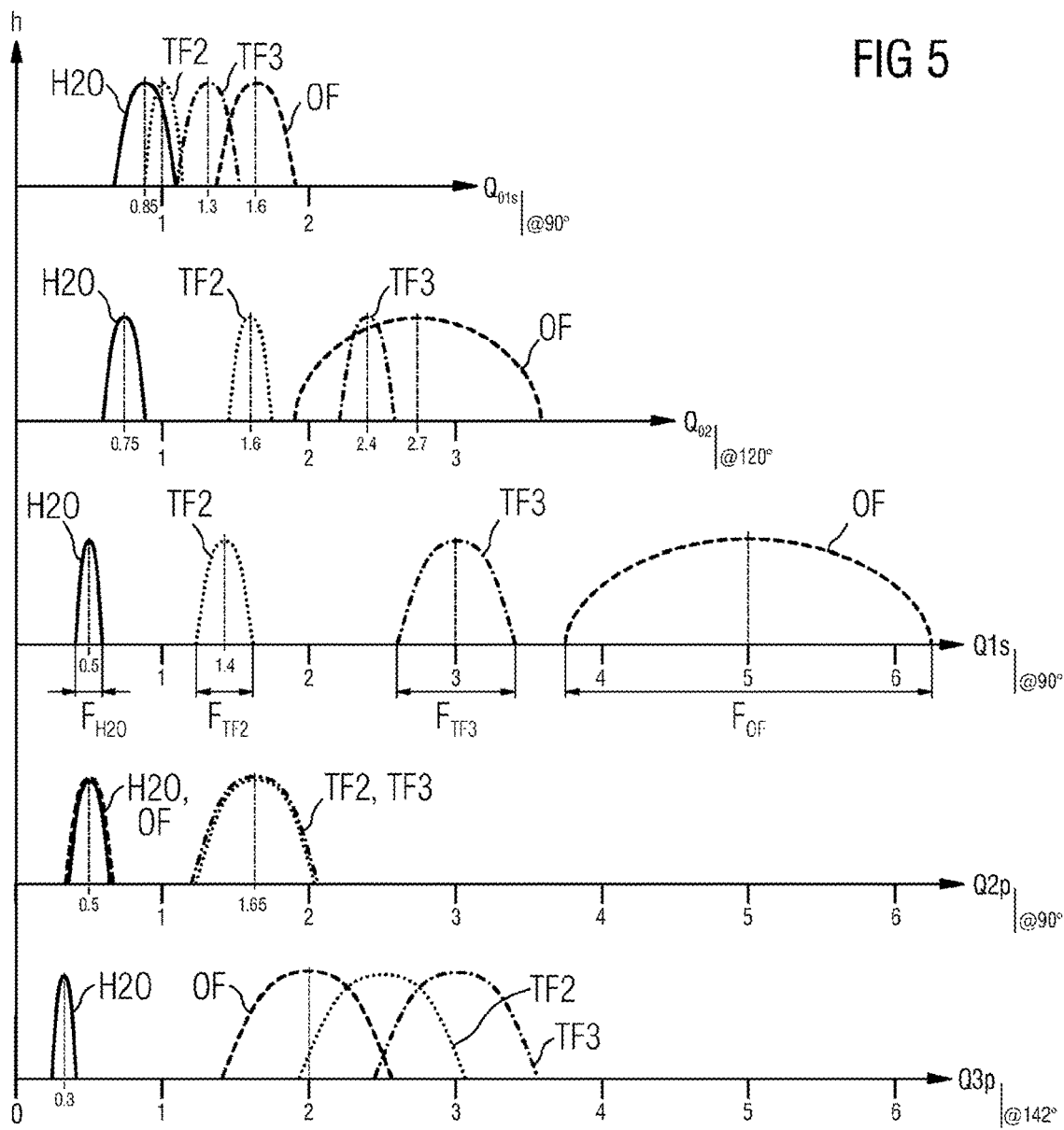
FIG. 5 shows an exemplary distribution of test fires, open fire and disturbance variables plotted against a quotient $Q_{01}$ of perpendicular polarized infrared light to unpolarized infrared light, against a quotient $Q_{02}$ of unpolarized blue light to unpolarized infrared light and also in accordance with the invention against a first quotient Q1s of perpendicular polarized blue light to unpolarized infrared light in accordance with the invention against a second quotient Q2p of parallel polarized blue light to unpolarized infrared light in each case in the case of a scatter angle of 90° and in accordance with the invention against a third quotient Q3p of parallel polarized blue light to unpolarized infrared light in the case of a scatter angle of 142°, incorporating teachings of the present disclosure.

In the example of FIG. 5, the first quotient Q1s is the ratio of the scattered radiation intensity $I_{\lambda,1}$ of the linear polarized first "blue" wavelength with respect to the scattered radiation intensity $I_{\lambda,2}$ of the unpolarized second "red" wavelength $\lambda_2$ of a respective photosensor signal in the case of the same scatter angle of 90°. The polarization plane of the polarizer extends in this example perpendicular to the scatter plane. The latter is specified by the optical axes of the two-color LED and the photosensor.

Two separate single-color LEDs (light-emitting diodes), as is the case in the scattered light arrangement in accordance with DE 10 2015 117 361 A1, are not required for the first and second wavelength owing to the wavelength-selective action of the polarizer. The number of components is consequently reduced since two LED chips are used having wavelengths that are different from one another in a single LED housing. The wavelength-selective polarizer is then optically connected downstream of the LED housing or optically connected upstream of the photosensor. In addition to saving a component, the remaining error is reduced after a calibration of the optical path in the detection unit. Typically, during the assembly of two separate light-emitting diodes larger relative deviations in orientation and placement with respect to one another arise than in the case of one two-color LED. In addition to the associated reduced assembly outlay there is considerably reduced calibration outlay of the optical path in the scattered light arrangement incorporating teachings of the present disclosure.

In some embodiments, almost identical scattered light volume and consequently also almost identical particles that are to be detected are illuminated along an essentially identical optical path by the use of the two-color LED. Consequently, the scattered light volume is only specified geometrically by the two-color LED and by the receiver, which is significantly more precise than two overlapping scattered light volumes defined by individual monochrome LEDs and a single receiver. Measurement errors owing to deviating optical axes, as is the case in the use of the two separate adjacent LEDs in DE 10 2015 117 361 A1, do not occur in this case or are insignificant.

In some embodiments, the polarizer has optical properties such that the light of the first wavelength $\lambda_1$ that is passing through the polarizer is at least in part polarized while the light of the second wavelength $\lambda_2$ that is passing through is essentially not polarized. As a consequence, it is possible depending upon the scatter angle to distinguish an open fire from smoldering fires.

In some embodiments, the polarizer has optical properties such that the light of the second wavelength $\lambda_2$ that is passing through the polarizer or the unpolarized incident light of the second wavelength $\lambda_2$ that is passing through the polarizer has a maximum degree of polarization of 0.05. This value of 0.05 for the degree of polarization means in this case that the light of the second wavelength $\lambda_2$ that is passing through is polarized by a maximum of 5% and that the polarizer is more or less transparent for light of the second "red" wavelength $\lambda_2$. In other words, the polarizer is more or less transparent irrespective of the polarization state of the light. The polarizer consequently only acts as a polarizer for one of the two wavelengths $\lambda_1$. The other wavelength $\lambda_2$ is allowed to pass through without selecting a polarization direction.

In some embodiments, the polarizer comprises a polarization plane, in other words the polarizer embodies a polarization plane. The polarizer moreover has optical properties such that a proportion of at least 50%, in particular at least 80%, of the light of the first wavelength $\lambda_1$ that is polarized parallel to the polarization plane of the polarizer passes through the polarizer. Conversely, only a proportion of at most 5%, in particular at most 1%, of light of the first wavelength $\lambda_1$ that is polarized perpendicular to the polarization plane of the polarizer passes through the polarizer. In other words, the polarizer is more or less transparent for light proportions of the first "blue" wavelength $\lambda_1$, said light proportions being polarized parallel to the polarization plane of the polarizer, and is more or less opaque for "blue" light proportions that are perpendicular to said polarization plane.

In some embodiments, the polarizer is a wavelength-selective linear polarizer. In some embodiments, the polarizer is a polarizer produced from a polymer film, in particular from a polyvinyl alcohol film (PVA) having for example diffused iodine. The polarizer can be for example a mechanically stretched polyvinyl alcohol film for orienting the polymer chains having embedded, in particular thermally-stable coloring agents. A PVA film of this type is preferably protected on both sides by a tri-acetate cellulose layer.

Linear polarizers of this type, even if for an entirely different purpose, are known in the field of LCD display technology. The polarizers are spectrally embodied for the sensitivity of human eyes in a wavelength range of approximately 400 to 700 nm. Known production firms for polarizers of this type are for example Bolder Vision Optik Inc. with the polarizer type "BV0244", Edmund Optics GmbH with the polarizer type "TECHSPEC High Contrast Plastic Linear Polarizer" (Art. #86-187), Nitto Deutschland GmbH with the polarizer type "SEG1425DU" or Polatechno Co. Ltd with the polarizer type "EHC-125U".

The polarizers that can be bought from the mentioned firms can be obtained as plastic film (for example 100 mm×100 mm) having a typical thickness of less than 1 mm. This film can be cut in a simple manner for example to a polarizer in accordance with the invention having a size of 5 mm×5 mm to 10 mm×10 mm. The cut films can be circular, rectangular or square.

In some embodiments, a wire mesh polarizer or a so-called dye type polarizer can also be used as a wavelength-selective linear polarizer. In some embodiments, there is a polarizer that comprises a linear polarizer that is embodied as planar and that polarizes to approximately the same intensity for both of the emitted wavelengths $\lambda_1$, $\lambda_2$ of the two-color LED and also an optical retardation plate that flatly adjoins said linear polarizer. The retardation plate comprises an outer surface that lies opposite the surface that adjoins the linear polarizer. The outer surface of the retardation plate is oriented as a part of the polarizer toward the common scattered light volume. In this case, the polarizer is optically connected upstream of the photosensor or optically connected downstream of the two-color LED.

The retardation plate causes a phase displacement between the two polarization components of the light that is passing through the plate. The phase displacement depends upon the birefringence Δn of the material of the retardation plate and on the thickness d of said retardation plate. The resulting optical retardation R therefore amounts to Δn*d. The optical retardation R of the retardation plate is therefore matched to the second wavelength $\lambda_2$ of the emitted LED light, such as for example to a wavelength of 940 nm in such a manner that this retardation plate acts as a λ/4 plate to the second wavelength $\lambda_2$. LED light that impinges upon the smoke particles that are to be detected is polarized by these smoke particles.

The retardation plate acts upon this scattered polarized light as follows: By scattering on the scattering particles linear polarized light is polarized in a circular manner after passing through the retardation plate. Only one of the two polarization components of the circular polarized light can pass through the linear polarizer that follows the retardation plate. If the scatter on the scattered particles does not polarize the light, the retardation plate does not have any effect. Even in this case, only one of the two polarization components of the unpolarized light can pass through the linear polarizer.

In total, the arrangement of the retardation plate and the following polarizer acts in such a manner as though unpolarized light would impinge upon the photosensor however with a loss of signal of 50%. For light of the first wavelength $\lambda_1$, such as for example of 470 nm=½·940 nm, the retardation plate acts approximately as a λ/2 plate that rotates the direction of polarity about 90°. In comparison to the preceding embodiment having a wavelength-selective linear polarizer, in this case the polarization plane of the non-wavelength dependent polarizer is rotated about 90°.

In some embodiments, the two-color LED is arranged at a first scatter angle of 45° to 135°, in particular of 60° to 120° and e.g. of 90°±5°, with respect to the photosensor. The two-color LED and the photosensor are oriented toward a common scattered light volume. The polarizer is a linear polarizer. It is optically connected either upstream of the photosensor or downstream of the two-color LED. Typically, a polarizer that is optically connected upstream of the photosensor or a polarizer that is optically connected downstream of the two-color LED is arranged orthogonally with respect to the optical axis of the photosensor or the two-color LED. The polarizer is preferably oriented in such a manner that its polarization plane includes an angle of 90°±5° having a scatter plane that is spanned by the optical axes of the two-color LED and the photosensor. Consequently, in relation to the scatter plane, it is a <<perpendicular>> polarizer. Particularly reliable results concerning measuring technology are provided if the scatter angle between the two-color LED and the photosensor is 90° and if the polarization plane of the polarizer extends perpendicular with respect to the scatter plane.

In some embodiments, in the case of a scatter angle between the two-color LED and the photosensor of 90°±5°, the control unit is configured for the purpose of determining a first quotient Q1s of the two scattered radiation intensities $I_{\lambda 1}$, $I_{\lambda 2}$. The control unit is configured for the purpose of outputting a fire alarm or a smoldering fire alarm if the first quotient Q1s is within a first or second quotient range. The first quotient range is matched to the test fire TF2 (smoldering fire, pyrolysis smoldering fire) and the second quotient range is matched to the test fire TF3 (smoldering fire, smoldering cotton fire). It is possible by the output of a specific smoldering fire alarm to take prepared measures for extinguishing a fire since it is necessary to contend with a large buildup of smoke. A differentiation of open fire from smoldering fire is consequently advantageously possible.

In some embodiments, the control unit can be configured for the purpose of outputting a fire alarm or a fire alarm for an open fire if the first quotient Q1s is within a third quotient range. The third quotient range is matched to test fire for open fire. It is possible by the output of a specific fire alarm for open fire to take advantageously prepared measures for extinguishing a fire since in this case, apart from a few exceptions (test fire TF8, Decalin fire), it is necessary to contend with high temperatures on-site.

In some embodiments, the control unit can be configured for the purpose of determining a first quotient Q1s of the two scattered radiation intensities $I_{\lambda 1}$, $I_{\lambda 2}$ and can be configured for the purpose of suppressing an output of a fire alarm and/or for the purpose of outputting a warning message for detected "water" in the scattered light volume if the first quotient Q1s is within a fourth quotient range. The fourth quotient range is matched to or is indicative of the presence of water vapor or water mist. As a consequence, it is possible to prevent the output of a possible false alarm.

In some embodiments, for a respective value range of the above-mentioned quotient ranges: the quotient values of the fourth quotient range "water vapor"<quotient values of the first quotient range "pyrolysis smoldering fire"<Quotient values of the second quotient range "smoldering cotton fire"<quotient values of the third quotient range "open fire". Qualitatively, that means: the larger the quotient values, the smaller the detected particles.

For the example in accordance with FIG. 5, the first quotient range comprises a value for the first quotient Q1s of 1.4±0.2, in particular of 1.4±0.15. The second quotient range comprises a value for the first quotient Q1s of 3±0.5, in particular 3±0.4. The third quotient range comprises a value for the first quotient Q1s of 5±1.3, in particular of 5±1.25. The fourth quotient range comprises a value for the first quotient Q1s of 0.5±0.15, in particular of 0.5±0.1. The values of the respective quotient ranges are dependent upon the scatter angle and also on the orientation of the polarization plane of the polarizer.

In accordance with updated tests concerning measuring technology, the first quotient range comprises a value for the first quotient Q1s of 1.35±0.2. The second quotient range comprises a value of 2±0.5. The third quotient range comprises a value of 5±1.6. The fourth quotient range comprises a value of 0.6±0.2. The values of the respective quotient ranges are in this case in turn dependent upon the scatter angle and also upon the orientation of the polarization plane of the polarizer.

It is noted that in lieu of the previous quotient ranges, it is also possible to determine the respective reciprocal value. In this case, the respective values for the quotient ranges have the reciprocal value. Moreover, the relational operators likewise invert smaller or larger.

Furthermore, it is noted that the above-mentioned quotient ranges have been determined in a manner concerning measuring technology in the case of a scatter angle of 90° and perpendicular polarization plane. In general, the quotients Q1s of the test fires TF2, TF3 and water vapor H2O move toward one another with decreasing scatter angle values, wherein the distances decrease with respect to one another. With increasing scatter angle values, on the one hand the quotients Q1s of the test fire TF2 and water vapor H2O converge and on the other hand the quotients Q1s of the test fire TF3 and open fire OF converge closely.

In some embodiments, the scatter angle between the two-color LED and the photosensor is 90°±5°. The polarization plane of the polarizer extends parallel to the scatter plane. The latter is specified by the optical axes of the two-color LED and the photosensor. The control unit is configured for the purpose of determining a second quotient Q2p of the two scattered radiation intensities $I_{\lambda 1}$, $I_{\lambda 2}$. The control unit is configured for the purpose of outputting a fire alarm, if the second quotient Q2p is within a further first or further second quotient range. The further first quotient range is in this case matched to open fire OF and the further second quotient range is matched to test fire TF2 and TF3 (smoldering fire, pyrolysis-smoldering fire). The control unit can alternatively or in addition be configured for the purpose of outputting a specific open fire if the second quotient Q2p is within the further first quotient range. In some embodiments, the control unit can be configured for the purpose of outputting a specific smoldering fire alarm if the second quotient Q2p is within the further second quotient range.

In the present case, however, it is not possible to differentiate between open fire OF and water vapor since in the presence of water vapor or water mist the second quotient Q2p comprises approximately the values of the further first quotient range.

In some embodiments, the scatter angle, in other words a second scatter angle, between the two-color LED and the photosensor is 142°±5°, e.g. 142°±1°. The light that is scattered in this angle range onto water vapor or water mist is intensely polarized as in the case of a rainbow. The polarization plane of the polarizer extends parallel with respect to the scatter plane. In relation to the scatter plane the polarizer is consequently a <<parallel>> polarizer. The latter is specified by the optical axes of the two-color LED and the photosensor. The control unit is configured for the purpose of determining a third quotient Q3p of the two scattered radiation intensities $I_{\lambda 1}$, $I_{\lambda 2}$. The control unit is configured for the purpose of outputting a fire alarm if the third quotient Q3p is within a yet further second quotient range. A yet further first quotient range is in this case matched to the presence of water vapor H2O and the yet further second quotient range is matched to the test fire TF2 and TF3 (smoldering fire, pyrolysis-smoldering fire) and also to open fire OF. In the present case, it is possible to reliably detect a fire. At the same time, it is possible to reliably differentiate between a fire and between the presence of water vapor. In other words, it is possible to reliably identify water vapor and consequently to suppress disturbances.

In some embodiments, the two-color LED is arranged at a second scatter angle of 142°±5°, e.g. of 142°±1°, with respect to the photosensor. The second scatter angle can also be referred to as a backward scatter angle since it is clearly greater than 90°. The two-color LED and the photosensor are oriented toward a common scattered light volume. The polarizer is a linear (wavelength-selective) polarizer. The polarizer is optically connected upstream of the photosensor or downstream of the two-color LED. The polarizer is oriented in such a manner that its polarization plane includes an angle of 0°±5°, e.g. of 0°, to a scatter plane that is spanned by the optical axis of the two-color LED and the photosensor. In other words, the polarization plane extends parallel with respect to this spanned scatter plane.

The light that is scattered at the second scatter angle onto water vapor or water mist is intensely polarized as in the case of a rainbow. Consequently, in the case of a water phenomenon of this type the third quotient Q3p is displaced more intensely into the disturbance variable range, in other words to "large particles" such as dust, in comparison to a scattered light arrangement without a polarization filter.

In some embodiments, the control unit is configured for the purpose of determining a third quotient Q3p of the two scattered radiation intensities $I_{\lambda 1}$, $I_{\lambda 2}$. The control unit is moreover configured for the purpose of suppressing the output of a fire alarm and/or for the purpose of outputting a warning message for detected water vapor or water mist in the scattered light volume if the third quotient Q3p is within the yet further first quotient range. The yet further first quotient range can be determined for example in a manner concerning measuring technology.

In some embodiments, in lieu of the only one photosensor, the scattered light smoke detector has a first and second photosensor having a first and second polarizer that are optically connected upstream and, in dependence upon the respective wavelength $\lambda_1$, $\lambda_2$ of the respective light that is passing through, said first and second polarizers polarize said light at different intensities. The two-color LED is arranged at a first scatter angle of 45° to 135°, in particular of 60° to 120° and preferably of 90°±5°, with respect to the first photosensor. The two-color LED is moreover arranged at a second scatter angle of 142°±5°, preferably of 142°±1°, with respect to the second photosensor. The two-color LED and the two photosensors are oriented toward a common scattered light volume. The control unit is connected to the two-color LED and to the two photosensors in particular for signal purposes and/or for data purposes and said control unit is configured for the purpose of actuating the two-color LED so as to emit light of the first or second wavelength $\lambda_1$, $\lambda_2$. The control unit is moreover configured for the purpose of detecting each photosensor signal of the two photosensors, for the purpose of determining respectively a first and second scattered radiation intensity $I_{\lambda 11}$, $I_{\lambda 12}$; $I_{\lambda 21}$, $I_{\lambda 22}$ for the first and second wavelength $\lambda_1$, $\lambda_2$ on the basis of the respective photosensor signal and for the purpose of taking into account the respective first and second scattered radiation intensities $I_{\lambda 11}$, $I_{\lambda 12}$; $I_{\lambda 21}$, $I_{\lambda 22}$ in the event of a fire alarm.

The scattered light volume is defined geometrically or structurally as the sectional volume of the emitted light beam of the two-color LED having the optical receiving sensor of the respective photosensor.

In some embodiments, in lieu of the one photosensor, the scattered light smoke detector has a first and second photosensor. The two-color LED may be arranged at a first scatter angle of 45° to 135°, in particular of 60° to 120° and e.g. of 90°±5°, with respect to the first photosensor. Moreover, the two-color LED is arranged at a second scatter angle of 142°±5°, e.g. of 142°±1°, with respect to the second photosensor. The two-color LED and the two photosensors are oriented toward a common scattered light volume. A polarizer is optically connected downstream of the two-color LED and, in dependence upon the respective wavelength $\lambda_1$, $\lambda_2$ of the respective light that is emitted by the two-color LED and that is passing through said polarizer, said polarizer polarizes said light at different intensities. The control unit is connected to the two-color LED and the two photosensors in particular for signal purposes and/or for data purposes and is configured or programmed for the purpose of actuating the two-color LED so as to emit light of the first or second wavelength $\lambda_1$, $\lambda_2$, for the purpose of detecting a photosensor signal of the two photosensors, for the purpose of determining respectively a first and second scattered radiation intensity $I_{\lambda 11}$, $I_{\lambda 12}$; $I_{\lambda 21}$, $I_{\lambda 22}$ for the first and second wavelength $\lambda_1$, $\lambda_2$ on the basis of the respective photosensor signal and for the purpose of taking into account the respective first and second scattered radiation intensities $I_{\lambda 11}$, $I_{\lambda 12}$; $I_{\lambda 21}$, $I_{\lambda 22}$ in the event of a fire alarm.

In some embodiments, in this case in lieu of two wavelength-selective polarizers, only one single wavelength-selective polarizer is required. Moreover, the distance between open fire and smoldering fire increases. Furthermore, the structural design is simplified.

In some embodiments, in lieu of the only one two-color LED, the scattered light alarm can have a first and second two-color LED having a first and second polarizer that are optically connected downstream and that, in dependence upon the respective wavelength $\lambda_1$, $\lambda_2$ of the respective light that is passing through, polarize said light at different intensities. This scattered light arrangement can be regarded as a dual scattered light arrangement with respect to the preceding embodiment. The photosensor is arranged at a first scatter angle in the range of 45° to 135°, in particular of 60° to 120° and e.g. of 90°±5°, with respect to the first two-color LED. Moreover, the photosensor is preferably arranged at a second scatter angle of 142°±5°, e.g. of 142°±1°, with respect to the second two-color LED. The photosensor and the two two-color LEDs are oriented toward a common scattered light volume. The control unit is connected to the photosensor and to the two two-color LEDs in particular for signal purposes and/or for data purposes. The control unit is moreover configured for the purpose of actuating the two two-color LEDs respectively so as to emit light of the first or second wavelength $\lambda_1$, $\lambda 2$, for the purpose of detecting a photosensor signal of the photosensor, for the purpose of determining respectively a first and second scattered radiation intensity $I_{\lambda 11}$, $I_{\lambda 12}$; $I_{\lambda 21}$, $I_{\lambda 22}$ for the first and second wavelength $\lambda_1$, $\lambda_2$ on the basis of the two-color LED that is actuated respectively and for the purpose of taking into account the respective first and second scattered radiation intensities $I_{\lambda 11}$, $I_{\lambda 12}$; $I_{\lambda 21}$, $I_{\lambda 22}$ in the event of a fire alarm.

In some embodiments, in lieu of the one two-color LED, the scattered light smoke detector in accordance with the invention has a first and second two-color LED. The photosensor is arranged at a first scatter angle in the range of 45° to 135°, in particular of 60° to 120° and e.g. of 90°±5°, with respect to the first two-color LED. Moreover, the photosensor is arranged at a second scatter angle of 142°±5°, e.g. of 142°±1°, with respect to the second two-color LED. The photosensor and the two two-color LEDs are oriented toward a common scattered light volume.

A polarizer is optically connected upstream of the photosensor and, in dependence upon the respective wavelength $\lambda_1$, $\lambda_2$ of the respective light that is passing through, said polarizer polarizes said light at different intensities. The control unit is connected to the photosensor and the two two-color LEDs in particular for signal purposes or for data purposes. The control unit is configured or programmed for the purpose of actuating the two two-color LEDs respectively so as to emit light of the first or second wavelength $\lambda_1$, $\lambda_2$, for the purpose of detecting a photosensor signal of the photosensor, for the purpose of determining respectively a first and second scattered radiation intensity $I_{\lambda 11}$, $I_{\lambda 112}$; $I_{\lambda 21}$, $I_{\lambda 22}$ for the first and second wavelength $\lambda_1$, $\lambda_2$ on the basis of the two-color LED that is actuated respectively, and for the purpose of taking into account the respective first and second scattered radiation intensities $I_{\lambda 11}$, $I_{\lambda 12}$; $I_{\lambda 21}$, $I_{\lambda 22}$ in the event of a fire alarm.

In some embodiments, in lieu of two wavelength-selective polarizers only one single wavelength-selective polarizer is required. Moreover, the distance between open fire and smoldering fire increases. As a consequence, the structural design is simplified.

The above-mentioned four embodiments render possible a combined evaluation with increased safety with respect to false alarms in the sense of a multiple criteria smoke detector, in particular with regard to water vapor or water mist as a disturbance variable in the event of detecting a fire.

In some embodiments, the first and second polarizer in the case of the above-described two embodiments having two polarizers are linear (wavelength-selective) polarizers. The first polarizer is oriented in such a manner that its polarization plane includes an angle of 90°+/−5° having a scatter plane that is spanned by the optical axes of the two-color LED(s) and the photosensors or the photosensor. The second polarizer is oriented in such a manner that its polarization plane includes an angle of 0°±5° with this plane.

The first "perpendicular" polarizer in the case of the scattered light arrangement having a single two-color LED and having two photosensors is optically connected upstream of the photosensor that is arranged at an angle of 90°±5° with respect to the two-color LED. Accordingly, the second "parallel" polarizer is connected upstream of the remaining photosensor (cf. FIG. 9).

In the other "dual" case, the first "perpendicular" polarizer is optically connected downstream of the two-color LED that is arranged at an angle of 90°±5° with respect to the single photosensor. Accordingly, the second "parallel" polarizer is connected downstream of the remaining two-color LED (cf. FIG. 11).

In some embodiments, in the case of the above-described two embodiments having a single polarizer, the polarizer is a linear (wavelength-selective) polarizer. The latter is oriented in such a manner that its polarization plane includes an angle of 0°±5° having a scatter plane that is spanned by the optical axis of the two-color LED or the photosensor.

In some embodiments, the control unit at the first scatter angle (90°±5°) and in the case of a perpendicular orientation of the polarization plane of the respective polarizer in relation to the scatter plane, is configured for the purpose of determining a first quotient Q1s of the first and second scattered radiation intensity $I_{\lambda 11}$, $I_{\lambda 12}$ that are allocated to the first scatter angle and for the purpose of determining a third quotient Q3p of the first and second scattered radiation intensity $I_{\lambda 21}$, $I_{\lambda 22}$ that are allocated to the second scatter angle.

Moreover, the control unit is configured for the purpose of outputting a fire alarm and/or smoldering fire alarm if the first quotient Q1s is within the first or second quotient range, or for the purpose of outputting a fire alarm and/or a fire alarm for open fire if the first quotient Q1s is within the third quotient range. Moreover, the control unit is configured for the purpose of suppressing the output of a fire alarm and/or for the purpose of outputting a warning message for detected water vapor or water mist in the scattered light volume if the first quotient Q1s is within the fourth quotient range and/or the third quotient Q3p is within the yet further first quotient range. In particular, the control unit is configured for the purpose of suppressing the output of a fire alarm and/or for the purpose of outputting a warning message for detected water vapor or water mist in the scattered light volume if the first quotient Q1s is within the fourth quotient range and simultaneously the third quotient Q3p is within the yet further first quotient range. As a consequence, the false alarm safety is increased.

In some embodiments, the control unit at the first scatter angle (90°±5°) and in the case of a parallel orientation of the polarization plane of the respective polarizer in relation to the scatter plane, is configured for the purpose of determining a second quotient Q2p of the first and second scattered radiation intensity $I_{\lambda 11}$, $I_{\lambda 12}$ that are allocated to the first scatter angle and for the purpose of determining a third quotient Q3p of the first and second scattered radiation intensity $I_{\lambda 21}$, $I_{\lambda 22}$ that are allocated to the second scatter angle.

Moreover, the control unit is configured for the purpose of outputting a fire alarm and/or smoldering fire alarm if the second quotient Q2p is within the further first or second quotient range, or for the purpose of outputting a fire alarm if the third quotient Q3p is within the yet further second quotient range. Moreover, the control unit is configured for the purpose of suppressing the output of a fire alarm and/or for the purpose of outputting a warning message for detected water vapor or water mist in the scattered light volume if the second quotient Q2p is within the further first quotient range and/or the third quotient Q3p is within the yet further first quotient range. In particular, the control unit is configured for the purpose of suppressing the output of a fire alarm and/or for the purpose of outputting a warning message for detected water vapor or water mist in the scattered light volume if the second quotient Q2p is within the further first quotient range and simultaneously the third quotient Q3p is within the yet further first quotient range. As a consequence, the false alarm safety is advantageously increased.

In some embodiments, the two-color LED is embodied so as to emit light of the first wavelength $\lambda_1$ in a range of 380 nm to 570 nm, in particular of 470 nm±30 nm, and so as to emit light of the second wavelength $\lambda_2$ in a range of 750 nm to 1100 nm, in particular of 940 nm±30 nm.

The photosensor is in particular a semiconductor photodiode, in particular a silicon PIN photodiode. Said diode may be a silicon PIN photodiode having improved sensitivity to blue in the range of the first wavelength. The photosensor can alternatively also be a phototransistor.

In some embodiments, the control unit is configured for the purpose of actuating the two-color LED so as to emit pulsed light of the first wavelength $\lambda_1$ or of the second wavelength $\lambda_2$. Typically, the light pulses of the first or second wavelength $\lambda_1$, $\lambda_2$ are repeatedly radiated into the scattered light volume, in particular in a cyclical manner by actuation by means of the control unit, as for example with a repeating frequency in the range of 0.1 to 5 Hz. The pulse duration may be in the range of 20 μs to 1 ms.

In some embodiments, only light pulses of the first wavelength $\lambda_1$ are repeatedly radiated into the scattered light volume, in particular in a cyclical manner, as long as the associated scattered radiation intensity $I_{\lambda 1}$ remains below a minimum scattered light level. This minimum scattered light level is only exceeded if a sufficient concentration of smoke particles, dust, or vapor appears in the scattered light volume. In addition, light pulses of the second wavelength $\lambda_2$ are then radiated into the scattered light volume with the result that on the basis of the two-color principle it is possible to determine the particle size or a size that is equivalent to the particle size so as to determine the particle type in the scattered light volume by means of the control unit. The light pulses of the first and second wavelength $\lambda_1$, $\lambda_2$ are radiated alternately in this case into the scattered light volume by means of suitably pulsed actuation of the two-color LED by the control unit. This leads to a particularly power-saving operation of the smoke detector since averaged over the operating time it is only rarely necessary to radiate further light pulses of the second wavelength $\lambda_2$ into the scattered light volume.

In some embodiments, the control unit is configured for the purpose of standardizing the first and second scattered radiation intensities $I_{\lambda 11}$, $I_{\lambda 12}$ that are allocated to the first scatter angle to such an extent that the first quotient Q1s and/or the second quotient Q2p for scattered particles that are introduced into the scattered light volume and that have a predetermined average diameter in the range of 0.5 to 1.5 μm has a quotient value in the range of 1 to 3, in particular a quotient value of 2. In some embodiments, the control unit is configured for the purpose of standardizing the first and second scattered light intensities $I_{\lambda 21}$, $I_{\lambda 22}$ that are allocated to the second scatter angle to such an extent that the third quotient Q3p for scattered particles that are introduced into the scattered light volume and that have a predetermined average diameter in the range of 0.5 to 1.5 μm has a quotient value in the range of 1 to 3, in particular a quotient value of 2.

In some embodiments, a (wavelength-selective) polarizer is used in optical scattered light smoke detection according to the two-color principle. In this case, a two-color, in particular monochrome light of a first and second wavelength $\lambda_1$, $\lambda_2$, that is emitted for optical smoke detection is polarized at different intensities by means of the polarizer. The polarizer has optical properties such that the light that is passing through said polarizer is polarized at different intensities in dependence upon the respective wavelength $\lambda_1$, $\lambda_2$ of said light. The polarizer may be a linear polarizer having optical properties such that the light of the second wavelength $\lambda_2$ that is passing through said polarizer, in other words the unpolarized incident light of the second wavelength $\lambda_2$ that is passing through the linear polarizer, has a degree of polarization of maximum 0.05. This means that the polarizer is more or less transparent for light of the second "red" wavelength $\lambda_2$. In other words, the linear polarizer is more or less transparent irrespective of the polarization state of the light.

The polarizer essentially only acts as a polarizer for one of the two wavelengths $\lambda_1$. The other wavelength $\lambda_2$ is allowed through without selecting a polarization direction. The polarizer has optical properties such that a proportion of at least 50%, in particular of at least 80%, of light of the first wavelength $\lambda_1$ that is polarized parallel to the polarization plane passes through the polarizer. Conversely, only a proportion of at most 5%, in particular of at most 1%, of light of the first wavelength $\lambda_1$ that is polarized perpendicular to the polarization plane of the polarizer passes through the polarizer. The polarizer is consequently more or less transparent for light proportions of the first wavelength $\lambda_1$ parallel to the polarization plane of the polarizer and more or less opaque for light proportions perpendicular to said polarization plane of the polarizer.

In some embodiments, the scattered light smoke detector has a processor-supported control unit that is connected to at least one of the two two-color LEDs and to at least one of the two photosensors. Moreover, the control unit has output means at least for a fire alarm or for a warning message. Moreover, the control unit has an electronic storage device that can be loaded with a computer program. The computer program comprises in this case suitable instructions for the optical detection of fire and said instructions can be executed by the processor-supported control unit. The processor-supported control unit is preferably a microcontroller. A microcontroller of this type typically has a series of integrated hardware function units such as for example analogue/digital converters, digital/analogue converters, timers, digital input/output units and also bus interfaces, inter alia as output means for a fire alarm or a warning message.

Scattered light smoke detectors of this type typically have an alarm housing having at least one smoke entrance opening. Such a scattered light smoke detector preferably comprises an optical measuring chamber that is shielded from ambient light but allows in smoke that is to be detected. The latter comprises the at least one two-color LED and the at least one photosensor in a scattered light arrangement for the optical smoke detection in accordance with the invention. The optical measuring chamber typically has a plurality of lamellae that are shielded from ambient light and is therefore also referred to as a labyrinth.

In some embodiments, the scattered light smoke detector can be a so-called open scattered light smoke detector. In this case, the scattered light smoke detector does not have a labyrinth. On the contrary, the respective two-color LED and the respective photosensor are then arranged in the alarm housing. The two-color LED and the photosensor are moreover arranged in a scattered light arrangement having a scattered light volume that is arranged outside of the alarm housing and consequently having a scattered light volume that lies outside the entire scattered light smoke detector.

FIG. 1 illustrates a known scattered light arrangement having a two-color LED 1 and a photosensor 2. The two-color LED 1 is arranged at a scatter angle α1 of 60°. A refers to the connection contacts of the two-color LED 1, BL refers to a "blue" light beam that is emitted by the two-color LED 1 and that has a first wavelength $\lambda_1$ and RL refers to a "red" light beam having a second wavelength $\lambda_2$. The two light beams BL, RL intersect an optical detecting region EB of the photosensor 2 in a scattered light volume SV or measurement volume. Z is a scattered light center within the scattered light volume SV that is provided by the intersection of the optical transmitting axis SA of the two-color LED 1 and the optical receiving axis EA of the photosensor 2.

As FIG. 1 illustrates, the scattered light volume SV is embodied from two "blue" and "red" part scattered light volumes that do not entirely overlap. The small spatial differences are caused by the adjacent "misaligned" arrangement of the two LED chips on a chip carrier of the two-color LED for the emission of the blue beam and the red light beam.

Figure 2:
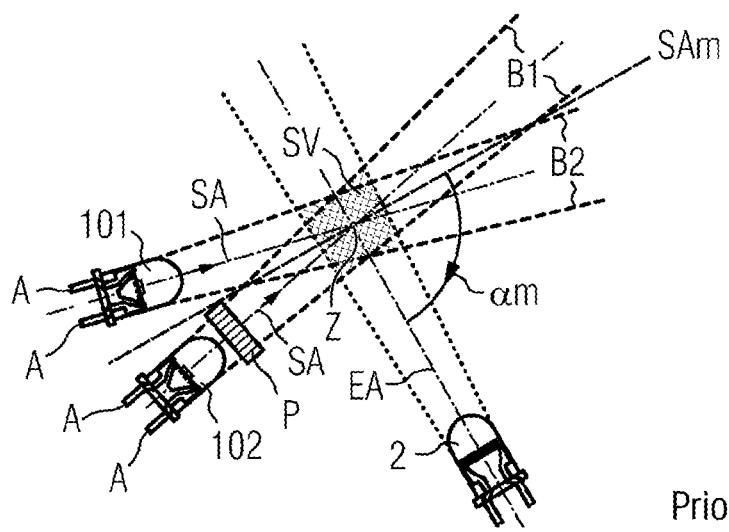
FIG. 2 shows a further scattered light arrangement according to the prior art having two single-color LEDs, having a polarizer that is connected downstream of one of the two LEDs and having a photosensor.

FIG. 2 illustrates a further known scattered light arrangement having two single-color LEDs 101, 102 having a polarizer P that is connected downstream of one of the LEDs 102 and having a photosensor 2. The two LEDs 101, 102 emit a light beam B1, B2 respectively. The optical transmitting axes SA of said LEDs are inclined with respect to one another and intersect in a scattered light center Z together with the optical receiving axis EA of the photosensor 2. In the present example, the angle offset of the two transmitting axes SA is approximately 25°—structurally as a result of their adjacent arrangement and as a result of the polarizer P that is connected downstream. $SA_m$ refers to a central optical transmitting axis for the two LEDs 101, 102 and said transmitting axis forms a central scatter angle αm of approximately 90° with the receiving axis EA of the photosensor 2. In the illustrated example, the polarizer P is a conventional polarizer. The polarization plane of said polarizer extends perpendicular to a scatter plane that is spanned by the optical axes SA, EA, in other words perpendicular to the image plane of the current FIG. 2.

Figure 3:
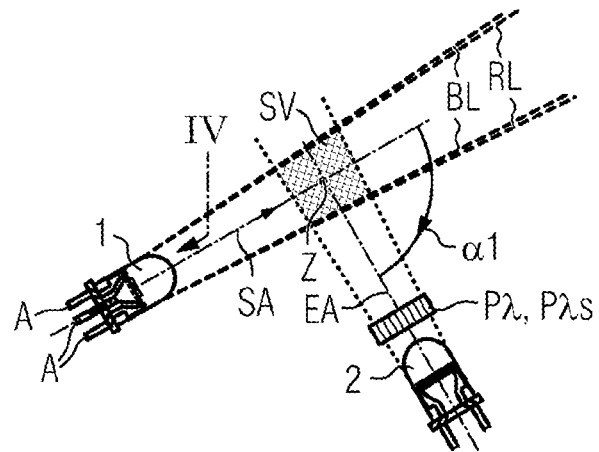
FIG. 3 shows an exemplary scattered light arrangement having a two-color LED, having a photosensor and having a wavelength-selective polarizer that is connected upstream of the photosensor incorporating teachings of the present disclosure.

FIG. 3 illustrates an exemplary scattered light arrangement for a scattered light smoke detector having a two-color LED 1, having a photosensor 2 and having a wavelength-selective polarizer Pλ that is optically connected upstream of this photosensor. The wavelength-selective linear polarizer Pλ in this case has optical properties such that the light that is passing through said polarizer is polarized at different intensities in dependence upon the respective wavelength $\lambda_1$, $\lambda_2$ of said light.

What is meant by this in particular is that the light of the first "blue" wavelength $\lambda_1$ that is passing through the polarizer Pλ, in other words the unpolarized incident light of the "blue" wavelength $\lambda_1$ that is passing through the polarizer, is at least in part polarized, while the light of the second "red" wavelength $\lambda_2$ that is passing through, in other words the unpolarized incident light of the second "red" wavelength $\lambda_1$ that is passing through the polarizer is essentially not polarized, in other words to a maximum of 5%. As is known, a linear polarizer comprises a polarization plane, in other words said polarizer forms a polarization plane. In conjunction with the wavelength-selectivity of the polarizer Pλ, this means that a proportion of at least 50%, in particular of at least 80%, of light of the first wavelength $\lambda_1$ that is polarized parallel to the polarization plane of the polarizer passes through the polarizer. Conversely, only a proportion of at most 5%, in particular of at most 1%, of light of the first wavelength $\lambda_1$ that is polarized perpendicular to the polarization plane of the polarizer Pλ passes through the polarizer Pλ.

The two-color LED 1 is embodied for the purpose of emitting light of a first wavelength $\lambda_1$ in a range of 380 nm to 570 nm, in particular of 470 nm±30 nm and/or of a second wavelength $\lambda_2$ in a range of 750 nm to 1100 nm, in particular of 940 nm±30 nm. The two-color LED 1 can have a standard housing having a diameter of mm or of 5 mm or can be embodied in SMD technology. The photosensor 2 is in particular a photodiode, in particular a silicon photodiode may be a silicon PIN photodiode. The photosensor is spectrally matched to at least the first and second wavelength $\lambda_1$, $\lambda_2$.

The two-color LED 1, the photosensor 2 and the wavelength-selective polarizer Pλ are typically arranged on a circuit carrier of the scattered light smoke detector. An electronic control unit, in particular a microcontroller, may be arranged on the circuit carrier. The control unit is electrically connected to the two-color LED and to the photosensor so as to actuate the two-color LED in a pulsed manner and also so as to detect in a manner concerning measuring technology a chronologically allocated photosensor signal and so as to evaluate a respective photosensor signal in response to fire parameters. In the case of a fire being detected, the control unit is configured for the purpose of outputting a fire alarm in an optical and/or acoustic manner at the scattered light smoke detector and/or to a superordinate central fire alarm system, such as for example via a wire-connected alarm bus or via radio.

In some embodiments, the wavelength-selective linear polarizer Pλ is optically connected upstream of the photosensor 2. The two-color LED 1 and the photosensor 2 are arranged at a scatter angle α1 of 90° that has proven advantageous with regard to measuring technology. Furthermore, in accordance with FIG. 3 the polarization plane of the wavelength-selective polarizer Pλ extends perpendicular to a plane that is spanned by the two optical axes SA, EA of the two-color LED 1 and the photosensor 2. The polarizer Pλ can consequently also be referred to as a perpendicular polarizer Pλs. Moreover, the polarizer plane (in other words the plane parallel to the disk-shaped or plate-shaped polarizer) of this polarizer Pλs is arranged and oriented approximately perpendicular to the receiving axis EA of the photosensor 2. In this context, it is noted that the two optical axes SA, EA do not necessarily have to intersect. It is sufficient if the two optical axes SA, EA are oriented toward a common scattered light volume SV that is to be structurally defined. In such a case, the polarization plane of the polarizer is oriented approximately perpendicular with respect to the central scatter plane of light from the two-color LED that reaches the receiver after scattering on aerosol.

The illustrated arrangement having the "perpendicular" polarizer Pλs has proven to be particularly advantageous with regard to measuring technology. In this case, the wavelength-selective polarization in comparison to a scattered light arrangement without polarizing filter causes the otherwise overlapping quotient ranges (cf. TF3 and OF of the quotient $Q_u$ of the scattered radiation intensities $I_{\lambda 1}$, $I_{\lambda 2}$ in FIG. 5) diverge from one another with the result that it is advantageously possible to reliably discriminate between open fires and smoldering fires while simultaneously discriminating water vapor or water mist (cf. TF3 and OF of the quotient Q1s in FIG. 5).

Figure 4:
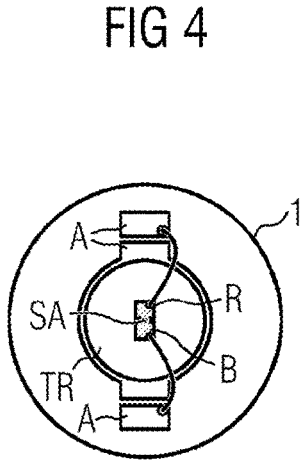
FIG. 4 shows an example for a two-color LED having two LED chips that are arranged adjacent to one another on a chip carrier of the two-color LED incorporating teachings of the present disclosure.

FIG. 4 illustrates an example for a two-color LED 1 having two LED chips R, B that are arranged adjacent to one another on a chip carrier TR of the two-color LED 1 along the viewing direction IV that is marked in FIG. 3. The illustrated two-color LED 1 has a known per se standard housing such as for example having a 5 mm diameter.

FIG. 5 illustrates a distribution, which is determined in a series of measurements, of test fires TF2, TF3, of open fire OF and also of disturbance variables H2O such as water vapor or water mist plotted against three different quotients $Q_{01s}$, $Q_{02}$, Q1s, Q2p and Q3p. The two test fires TF2, TF3 are specified in the standard EN54-7:2018. The upper part of FIG. 5 illustrates the quotient $Q_{01s}$ of the scattered light intensity of perpendicular polarized infrared light to the scattered light intensity of unpolarized infrared light, in each case having a wavelength of 940 nm and in each case at a scatter angle of 90°. A scattered light arrangement of this type is long known, such as for example in the previous FIG. 4.

The next lower part of FIG. 5 illustrates the quotient $Q_{02}$ of the scattered light intensity of unpolarized "blue" scattered light of the first wavelength $\lambda_1$ at 470 nm to the scattered light intensity of unpolarized infrared scattered light of the second wavelength $\lambda_2$ at 940 nm in each case at a scatter angle of 90°. This scattered light arrangement has also been known for a long time.

Figure 6:
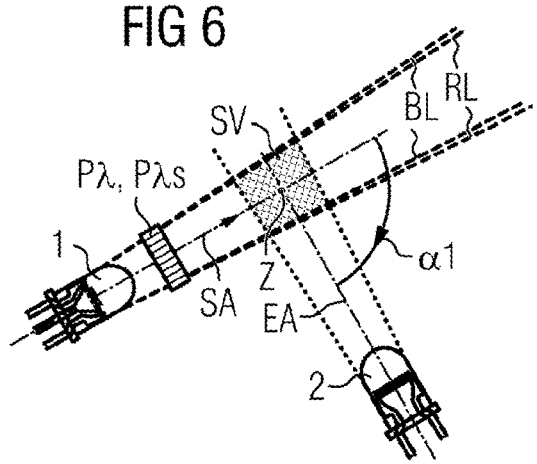
FIG. 6 shows an exemplary scattered light arrangement having a two-color LED, having a photosensor and having a wavelength-selective polarizer that is connected downstream of the two-color LED, incorporating teachings of the present disclosure.

The central part of FIG. 5 illustrates the first quotient Q1s of the scattered light intensity of perpendicular polarized "blue" scattered light of the first wavelength $\lambda_1$ at 470 nm to the scattered light intensity of unpolarized infrared scattered light of the second wavelength $\lambda_2$ at 940 nm in accordance with the example of FIG. 3 and FIG. 6 in each case at a scatter angle of 90°. The following part of FIG. 5 illustrates the second quotient Q2p of the scattered light intensity of parallel polarized "blue" scattered light of the first wavelength $\lambda_1$ at 470 nm to the scattered light intensity of unpolarized infrared scattered light of the second wavelength $\lambda_2$ at 940 nm in accordance with the example of FIG. 3 and FIG. 6 in each case at a scatter angle of 90°. In the present example, the further first quotient range has values for the second quotient Q2p in the range of 0.5±0.1 and the further second quotient range has values in the range of 1.65±0.4.

In accordance with updated tests concerning measuring technology, the first further quotient range comprises a value for the second quotient Q2p in the range of 0.4 to 0.8. The second further quotient range comprises a value in the range of 1.2 to 2.3. The values of the respective quotient ranges are in this case in turn dependent upon the scatter angle and also on the orientation of the polarization plane of the polarizer. Finally, the lower part of FIG. 5 illustrates the third quotient Q3p of the scattered light intensity of parallel polarized "blue" scattered light of the first wavelength $\lambda_1$ in the case of 470 nm to the scattered light intensity of unpolarized infrared scattered light of the second wavelength $\lambda_2$ in the case of 940 nm in accordance with the example of FIG. 7 and FIG. 8 in each case at a scatter angle of 142°. In the present example, the yet further first quotient range has values for the third quotient Q3p in the range of 0.3±0.1 and the yet further second quotient range has values in the range of 1.5 to 3.5.

In accordance with updated tests concerning measuring technology, the yet further first quotient range comprises a value for the third quotient Q3p in the range of 0.25 to 0.55 and the yet further second quotient range has values in the range of 1.4 to 3.7. The values of the respective quotient ranges are in this case in turn dependent upon the scatter angle and also the orientation of the polarization plane of the polarizer.

FIG. 6 illustrates an exemplary scattered light arrangement having a two-color LED 1, having a photosensor 2 and having a wavelength-selective polarizer Pλ that is connected downstream of the two-color LED 1. The illustrated scattered light arrangement differs from the scattered light arrangement in FIG. 3 only in the positioning of the wavelength-selective polarizer PX. As far as measuring technology is concerned, the two scattered light arrangements are equivalent to one another.

Figure 7:
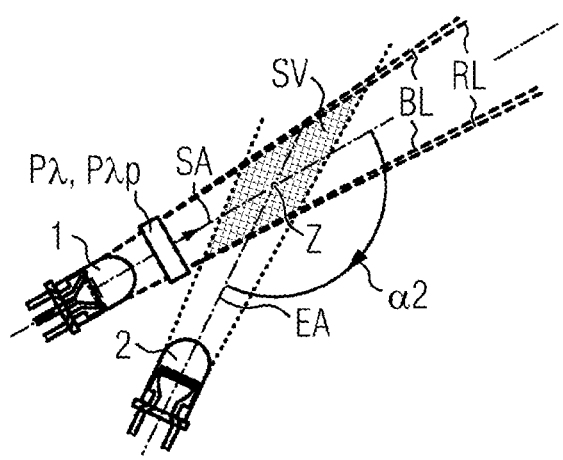
FIG. 7 shows an exemplary backward scattered light arrangement of a two-color LED, a photosensor and of a wavelength-selective polarizer that is connected downstream of the two-color LED, incorporating teachings of the present disclosure.

FIG. 7 illustrates an exemplary backward scattered light arrangement of a two-color LED 1, a photosensor 2 and of a wavelength-selective polarizer Pλ that is connected downstream of the two-color LED 1. In the present example, the wavelength-selective linear polarizer Pλ in accordance with the invention is optically connected downstream of the two-color LED 1. The two-color LED 1 and the photosensor 2 are arranged at a scatter angle α2 of 142°. Furthermore, in accordance with FIG. 7 the polarization plane of the wavelength-selective polarizer Pλ extends parallel to a plane that is spanned by the two optical axes SA, EA of the two-color LED 1 and the photosensor 2. The polarizer Pλ can consequently also be referred to as a parallel polarizer Pλp. Moreover, the polarizer plane of this polarizer Pλp is arranged and oriented perpendicular to the receiving axis EA of the photosensor 2.

The illustrated arrangement has proven to be particularly advantageous with regard to measuring technology. In this case, the intensely polarizing effect of water vapor or water mist on the LED light of the first wavelength $\lambda_1$ owing to the dipole effect of water molecules acts particularly significantly on the scattered light signal that is allocated to the first wavelength $\lambda_1$. As a consequence, water vapor and also water mist can be detected as one of the main disturbance variables in the case of optical smoke detection and a possible false alarm is avoided.

In this context, it is noted that the two optical axes SA, EA do not necessarily have to intersect. It is sufficient if the two optical axes SA, EA are oriented toward a common scattered light volume SV that is to be structurally defined.

Figure 8:
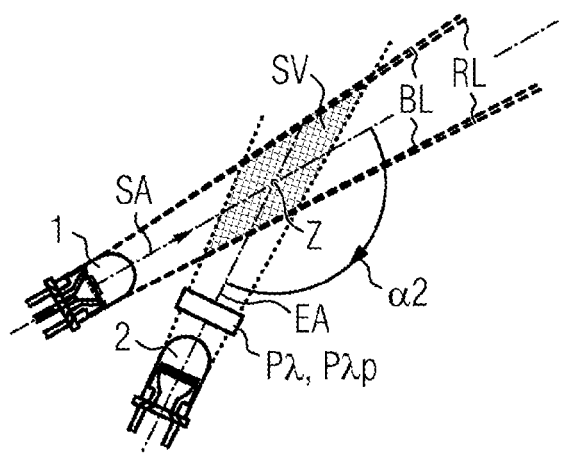
FIG. 8 shows an exemplary backward scattered light arrangement of a two-color LED, a photosensor and of a wavelength-selective polarizer that is connected upstream of the photosensor, incorporating teachings of the present disclosure.

FIG. 8 illustrates an exemplary backward scattered light arrangement of a two-color LED 1, a photosensor 2 and a wavelength-selective polarizer Pλ that is connected upstream of the photosensor 2. The illustrated scattered light arrangement differs from the scattered light arrangement in FIG. 7 only in the positioning of the wavelength-selective polarizer Pλ. As far as measuring technology is concerned, the two scattered light arrangements are equivalent to one another.

Figure 9:
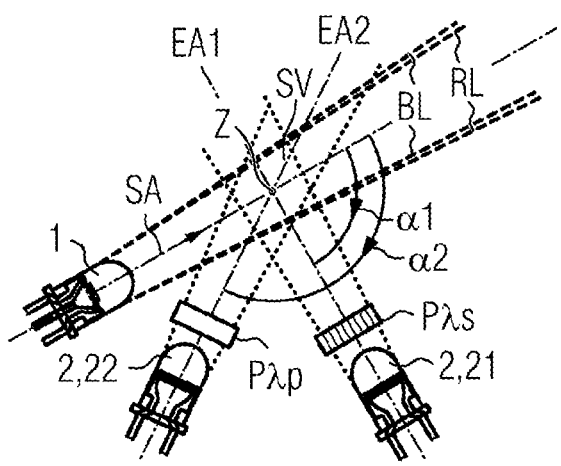
FIG. 9 shows a combined exemplary scattered light arrangement of a common two-color LED, a first photosensor and a second photosensor respectively having a wavelength-selective polarizer that is connected upstream, incorporating teachings of the present disclosure.

FIG. 9 illustrates a combined exemplary scattered light arrangement of a common two-color LED 1, a first photosensor 21 and a second photosensor 22 respectively having a wavelength-selective polarizer Pλs, Pλp that is connected upstream. The illustrated scattered light arrangement in this case is provided by the combination of the scattered light arrangement in accordance with FIG. 3 with the scattered light arrangement in FIG. 8. The two-color LED 1 is in turn arranged in a first scatter angle α1 of 90° with respect to the first photosensor 21 and in a second scatter angle α2 of 142° with respect to the second photosensor 22. The two wavelength-selective polarizers Pλs, Pλp also correspond in relation to the orientation of their polarization plane to the respective polarizers that are illustrated in FIG. 3 or FIG. 8.

The scattered light arrangement that is illustrated in FIG. 9 for a scattered light smoke detector combines the two advantages of the scattered light arrangements in accordance with FIG. 3 and FIG. 8 associated with an effective discrimination of open fires with respect to the test fire TF3 (smoldering cotton fire) and also with a particularly effective suppression of disturbance variables of water vapor and water mist.

Figure 10:
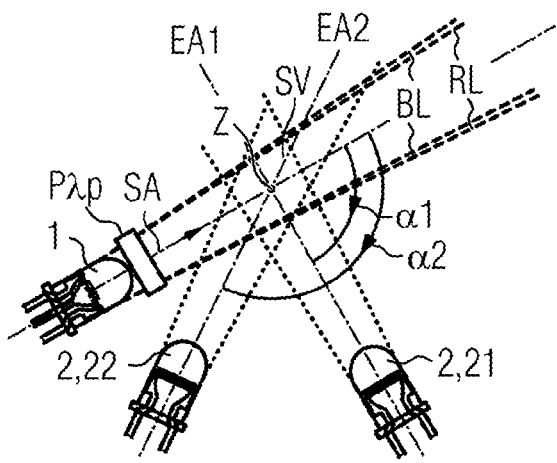
FIG. 10 shows an alternative embodiment to the embodiment in accordance with FIG. 9, incorporating teachings of the present disclosure.

FIG. 10 illustrates a further combined exemplary scattered light arrangement of a common two-color LED 1, a first photosensor 21 and a second photosensor 22. In comparison to the previous embodiment, the wavelength-selective polarizers Pλs, Pλp that are optically connected upstream of the two photosensors 21, 22 are not provided. In lieu of said polarizers, such a polarizer Pλp is optically connected downstream of the common two-color LED 1. It is preferred that the polarization plane of the wavelength-selective polarizer Pλp, as illustrated in FIG. 10, extends parallel to a plane that is spanned by the optical axis SA of the two-color LED 1 and by the two optical axes EA1, EA1 of the two photosensors 21, 22. The polarizer Pλ can consequently also be referred to as a parallel polarizer Pλp. Moreover, the polarizer plane of this parallel polarizer Pλp is arranged and oriented perpendicular to the transmitter axis SA of the two-color LED 1.

Figure 11:
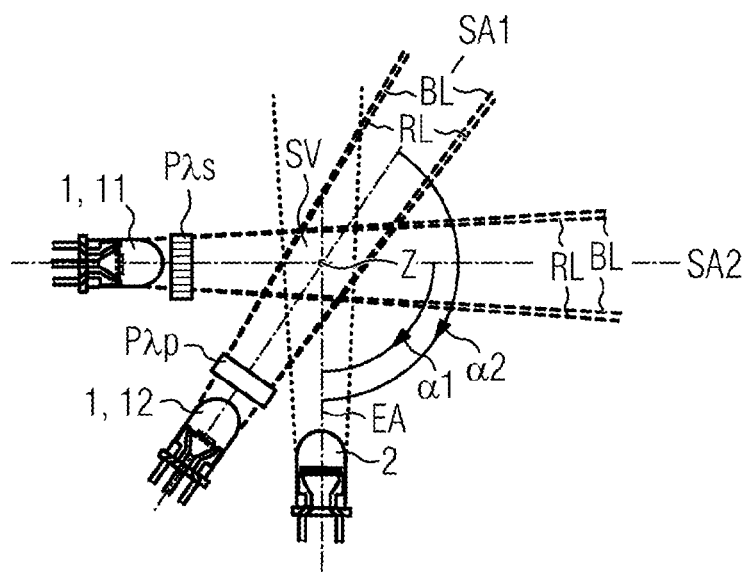
FIG. 11 shows a combined exemplary scattered light arrangement of a common photosensor, a first two-color LED and a second two-color LED in each case having a wavelength-selective polarizer that is connected downstream, incorporating teachings of the present disclosure.

FIG. 11 illustrates a combined exemplary scattered light arrangement of a common photosensor 2, a first two-color LED 11 and a second two-color LED 12 respectively having a wavelength-selective polarizer Pλs, Pλp that is connected downstream. The illustrated scattered light arrangement is provided in this case by the combination of the scattered light arrangement in accordance with FIG. 6 with the scattered light arrangement in FIG. 7. The photosensor 2 is in turn arranged in a first scatter angle α1 of 90° with respect to the first two-color LED 11 and in a second scatter angle α2 of 142° with respect to the second two-color LED 12. The two wavelength-selective polarizers Pλs, Pλp correspond in relation to the orientation of their polarization plane to the respective polarizers that are illustrated in FIG. 6 or FIG. 7.

Figure 12:
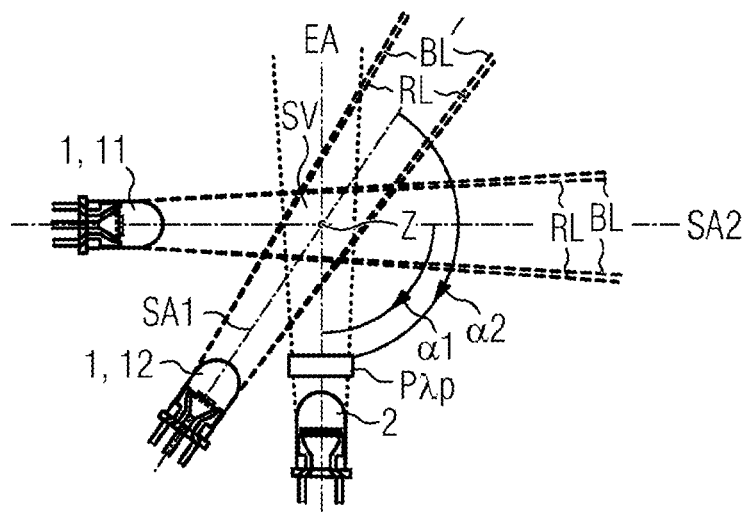
FIG. 12 shows an alternative embodiment to the embodiment in accordance with FIG. 11, incorporating teachings of the present disclosure.

FIG. 12 illustrates a further combined exemplary scattered light arrangement of a common photosensor 2, a first two-color LED 11 and a second two-color LED 12. In comparison to the previous embodiment, the two wavelength-selective polarizers Pλs, Pλp that are optically connected downstream of the two two-color LEDs 11, 12 are not provided. In lieu of said polarizers, such a wavelength-selective polarizer Pλp is optically connected upstream of the common photosensor 2. It is preferred that the polarization plane of the wavelength-selective polarizer Pλp, as illustrated in FIG. 12, extends parallel to a plane that is spanned by the two optical axes SA1, SA2 of the two two-color LEDs 11, 12 and by the optical axis EA of the common photosensor 2. The polarizer Pλ can consequently also be referred to as a parallel polarizer Pλp. Moreover, the polarizer plane of this parallel polarizer Pλp is arranged and oriented perpendicular to the receiving axis EA of the photosensor 2.

As far as measuring technology is concerned, the illustrated combined scattered light arrangements in accordance with FIG. 9 and FIG. 11 on the one hand and also the illustrated combined scattered light arrangements in accordance with FIG. 10 and FIG. 12 on the other hand are in each case equivalent to one another. Consequently, they provide the same above-described advantages.

Figure 13:
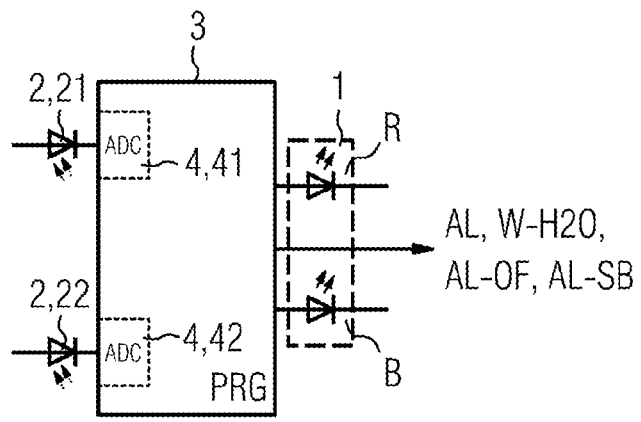
FIG. 13 shows an example of an electronic control unit for a scattered light smoke detector incorporating teachings of the present disclosure for connecting to (only) one two-color LED and to two photosensors, incorporating teachings of the present disclosure.

FIG. 13 illustrates an example of an electronic control unit 3 for a scattered light smoke detector for connection to (only) one two-color LED 1 and in an exemplary manner to two photosensors 21, 22. B refers to the first LED chip of the two-color LED 1 for emitting light of the first wavelength $\lambda_1$ and R refers to the second LED chip for emitting light of the second wavelength $\lambda_2$. The illustrated processor-supported control unit 3 is a microcontroller that already has two integrated A/D converters 41, for converting an analogue photosensor signal from the respective photosensor 21, 22 into corresponding digital values. PRG refers to a software program that can be executed on the microcontroller 3 and has suitable program steps in order to actuate the two LED chips B, R in a pulsed manner, to detect a corresponding chronologically allocated digitalized photosensor signal and to take this into account in the event of a fire alarm AL. The microcontroller 3 has a corresponding signal output for the alarm. Moreover, the software program PRG can have suitable program steps in order to output a fire alarm for an open fire AL-OF, a fire alarm for a smoldering fire AL-SB as an alternative or in addition to the output of a fire alarm AL. Furthermore, the software program PRG can have suitable program steps in order to output a warning message W-H2O for water vapor or water mist as a disturbance variable.

Figure 14:
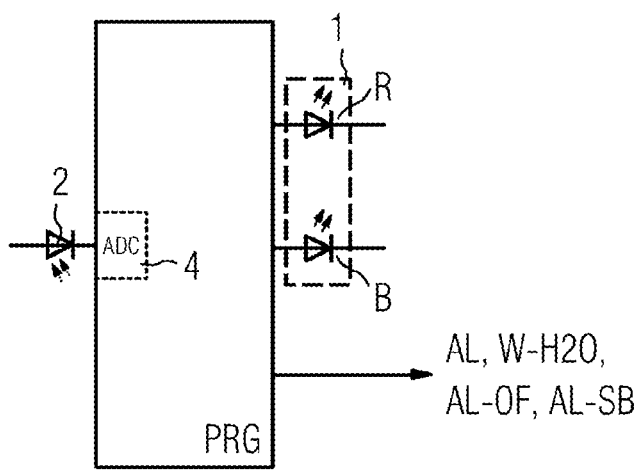
FIG. 14 shows an example of a further electronic control unit for a scattered light smoke detector incorporating teachings of the present disclosure for connecting to a photosensor and to a two-color LED.

Finally, FIG. 14 illustrates an example of a further electronic control unit 3 for a scattered light smoke detector for connection to (only) one photosensor 2 and to (only) one two-color LED 1. The reference numeral 4 refers again to an A/D converter 4 for converting an analogue photosensor signal into corresponding digital values.

LIST OF REFERENCE CHARACTERS 1, 11, 12 Two-color LED, dual LED
2, 21, 22 Photosensor, photodiode, silicon pin photodiode
3 Control unit, microcontroller, microcomputer
4, 41, 42 Analogue/digital converter
101, 102 Monochrome light-emitting diode, single-color LED α1 Scatter angle
α2 Backward scatter angle
αm Central scatter angle
A Connectors, connector contacts
AL Alarm signal, fire alarm,
AL-SB Fire signal for smoldering fire
AL-OF Fire signal for open fire
B Blue illuminating LED, LED chip
BL, B1, B2 Blue light beam, blue light
EA, EA1, EA2 Receiving axis, optical axis of the photosensor
EB Optical receiving range
$F_{TF2}$ First quotient range for test fire 2
$F_{TF3}$ Second quotient range for test fire 3
$F_{OF}$ Third quotient range for open fire
$F_{H2O}$ Fourth quotient range for water vapor
H2O Water vapor
OF Open fire
P Non-Wavelength dependent polarizer
Pλ, Pλs, Pλp Wavelength-selective polarizer
PRG Computer program
R Infrared illuminating LED, LED-chip
RL, R1, R2 Infrared light beam, red light
SA, SA1, SA2 Transmitting axis, optical axis of the two-color LED
$SA_m$ Central transmitting axis
SV Scattered light volume, scattered center, measuring volume
TF2 Test fire 2
TF3 Test fire 3
TR Chip carrier
W-H2O Warning signal, warning signal for detected water vapor
Z Optical center

What is claimed is:

1. A scattered light smoke detector comprising:
a two-color LED for emitting light of a first wavelength and a second wavelength;
a photosensor spectrally matched with said two-color LED; and
a control unit connected to the two-color LED and to the photosensor, the control unit configured to control the two-color LED to emit light of the first wavelength or the second wavelength and to detect a photosensor signal of the photosensor and to analyze the photosensor signal for a first scattered radiation intensity and a second scattered radiation intensity allocated respectively to the first wavelength and the second wavelength;
a polarizer optically connected upstream of the photosensor or downstream of the two-color LED, wherein the polarizer polarizes light passing through at different intensities in dependence upon the respective wavelength of said light;
a first photosensor and a second photosensor, wherein the two-color LED is arranged at a first scatter angle of 45° to 135° with respect to the first photosensor, the two-color LED is arranged at a second scatter angle of 142°±5° with respect to the second photosensor, and the two-color LED and the two photosensors are oriented toward a common scattered light volume; and
a polarizer connected optically downstream of the two-color LED, wherein, in dependence upon the respective wavelength of the respective light that is emitted by the two-color LED and that is passing through said polarizer, said polarizer polarizes said light at different intensities; and
wherein the control unit is connected to the two-color LED and to the two photosensors and is programmed to actuate the two-color LED so as to emit light of the first or second wavelength for the purpose of detecting each photosensor signal of the two photosensors for the purpose of determining respectively a first and second scattered radiation intensity for the first and second wavelength on the basis of the respective photosensor signal and for the purpose of taking into account the respective first and second scattered radiation intensities in the event of a fire alarm.

2. The scattered light smoke detector as claimed in claim 1, wherein the polarizer comprises a linear polarizer and is oriented so its polarization plane includes an angle of 0°±5° with a plane that is spanned by the optical axis of at least one of the two-color LED or the photosensor.

3. The scattered light smoke detector as claimed in claim 1, wherein the control unit is programmed to:
determine a second quotient of the first and second scattered radiation intensity allocated to the first scatter angle;
determine a third quotient of the first and second scattered radiation intensity allocated to the second scatter angle;
output a fire alarm and/or smoldering fire alarm if the second quotient is within the further second quotient range; or
output a fire alarm if the third quotient is within the yet further second quotient range; and
suppress an output of a fire alarm and/or for the purpose of outputting a warning message for detected water vapor or water mist in the scattered light volume if the second quotient is within the further first quotient range and/or if the third quotient is within the yet further first quotient range.

4. The scattered light smoke detector as claimed in claim 1, wherein the polarizer polarizes at least part of any light of the first wavelength passing through the polarizer at a first degree larger than any light of the second wavelength passing through.

5. The scattered light smoke detector as claimed in claim 4, wherein the light of the second wavelength passing through the polarizer has a maximum degree of polarization of 0.05.

6. The scattered light smoke detector as claimed in claim 4, wherein the polarizer has a polarization plane and optical properties such that a proportion of at least 50% of light of the first wavelength is polarized parallel to the polarization plane of the polarizer passes through the polarizer, while a proportion of at most 5%, of light of the first wavelength polarized perpendicular to the polarization plane of the polarizer passes through the polarizer.

7. The scattered light smoke detector as claimed in claim 1, wherein the polarizer comprises a wavelength-selective linear polarizer including a polymer film.

8. The scattered light smoke detector as claimed in claim 1, wherein:
the two-color LED is arranged at a first scatter angle of 45° to 135° with respect to the photosensor;
the two-color LED and the photosensor are oriented toward a common scattered light volume;
the polarizer comprises a linear polarizer;
the polarizer is optically connected either upstream of the photosensor or downstream of the two-color LED; and
the polarizer has a polarization plane with an angle of 90°±5° having a plane spanned by the optical axes of the two-color LED and the photosensor.

9. A scattered light smoke detector comprising:
a first two-color LED for emitting light of a first wavelength and a second wavelength;
a second two-color LED;
a photosensor spectrally matched with said two-color LED, the photosensor arranged at a first scatter angle in the range of 45° to 135° with respect to the first two-color LED and arranged at a second scatter angle of 142°±5° with respect to the second two-color LED;
a polarizer optically connected upstream of the photosensor or downstream of the first two-color LED, wherein the polarizer polarizes light passing through at different intensities in dependence upon the respective wavelength of said light;
wherein the photosensor, the first two-color LED, and the second two-color LED are oriented toward a common scattered light volume; and
a control unit connected to the photosensor and to the two two-color LEDs and programmed to actuate the two two-color LEDs respectively so as to emit light of the first or second wavelength for the purpose of detecting a photosensor signal of the photosensor, for the purpose of determining respectively a first and second scattered radiation intensity for the first and second wavelength on the basis of the respective actuated two-color LED and for the purpose of taking into account the respective first and second scattered radiation intensities in the event of a fire alarm.

10. The scattered light smoke detector as claimed in claim 9, wherein the polarizer polarizes at least part of any light of the first wavelength passing through the polarizer at a first degree larger than any light of the second wavelength passing through.

11. The scattered light smoke detector as claimed in claim 10, wherein the light of the second wavelength passing through the polarizer has a maximum degree of polarization of 0.05.

12. The scattered light smoke detector as claimed in claim 10, wherein the polarizer has a polarization plane and optical properties such that a proportion of at least 50% of light of the first wavelength is polarized parallel to the polarization plane of the polarizer passes through the polarizer, while a proportion of at most 5%, of light of the first wavelength polarized perpendicular to the polarization plane of the polarizer passes through the polarizer.

13. The scattered light smoke detector as claimed in claim 9, wherein the polarizer comprises a wavelength-selective linear polarizer including a polymer film.

14. The scattered light smoke detector as claimed in claim 9, wherein:
the two-color LED is arranged at a first scatter angle of 45° to 135° with respect to the photosensor;
the two-color LED and the photosensor are oriented toward a common scattered light volume;
the polarizer comprises a linear polarizer;
the polarizer is optically connected either upstream of the photosensor or downstream of the two-color LED; and
the polarizer has a polarization plane with an angle of 90°±5° having a plane spanned by the optical axes of the two-color LED and the photosensor.

15. The scattered light smoke detector as claimed in claim 14, wherein the control unit is programmed to:
determine a first quotient of the two scattered radiation intensities;
output a fire alarm or a smoldering fire alarm if the first quotient is within a first or second quotient range; or
output a fire alarm or a fire alarm for an open fire if the first quotient is within a third quotient range.

16. The scattered light smoke detector as claimed in claim 15, wherein for a respective value range of the quotient ranges the following applies:
quotient values of the fourth quotient range<
quotient values of the first quotient range<
quotient values of the second quotient range<
quotient values of the third quotient range.

17. The scattered light smoke detector as claimed in claim 14, wherein the control unit is programmed to:
determine a first quotient of the two scattered radiation intensities; and
suppress an output of a fire alarm and/or for the purpose of outputting a warning message for detected water vapor or water mist in the scattered light volume if the first quotient is within a fourth quotient range.

18. The scattered light smoke detector as claimed in claim 14, wherein the control unit is programmed to standardize the first and second scattered radiation intensities allocated to the first scatter angle to such an extent that the first quotient and/or the second quotient for scattered particles introduced into the scattered light volume and with a predetermined average diameter in the range of 0.5 to 1.5 μm has a quotient value in the range of 1 to 3, and/or wherein the control unit is programmed to standardize the first and second scattered light intensities allocated to the second scatter angle to such an extent that the third quotient for scattered particles introduced into the scattered light volume and with a predetermined average diameter in the range of 0.5 to 1.5 μm has a quotient value in the range of 1 to 3.

* * * * *